US010931678B2

(12) United States Patent
Zhang

(10) Patent No.: US 10,931,678 B2
(45) Date of Patent: Feb. 23, 2021

(54) AUTHORIZED-LOGIN IMPLEMENTATION METHOD AND DEVICE, APPARATUS, SYSTEM, PLATFORM, AND STORAGE MEDIUM

(71) Applicant: BEIJING BYTEDANCE NETWORK TECHNOLOGY CO., LTD., Beijing (CN)

(72) Inventor: Yuqing Zhang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/021,276

(22) Filed: Sep. 15, 2020

(65) Prior Publication Data
US 2020/0412734 A1    Dec. 31, 2020

Related U.S. Application Data

(63) Continuation of application No. PCT/CN2019/096758, filed on Jul. 19, 2019.

(30) Foreign Application Priority Data

Jul. 27, 2018    (CN) .......................... 201810848030.6

(51) Int. Cl.
*H04L 29/06*        (2006.01)
*G06F 16/957*       (2019.01)
(Continued)

(52) U.S. Cl.
CPC ............ *H04L 63/102* (2013.01); *G06F 9/541* (2013.01); *G06F 16/958* (2019.01); *G06F 16/9577* (2019.01); *H04L 63/0876* (2013.01)

(58) Field of Classification Search
CPC .................................................. H04L 63/102
See application file for complete search history.

(56) References Cited

U.S. PATENT DOCUMENTS

2008/0307506 A1   12/2008   Saldhana
2013/0085764 A1    4/2013   Sawka
(Continued)

FOREIGN PATENT DOCUMENTS

CN        102420846 A    4/2012
CN        104580251 A    4/2015
(Continued)

OTHER PUBLICATIONS

International Search Report and Written Opinion dated Oct. 25, 2019 for PCT Patent Application PCT/CN2019/096758.
(Continued)

*Primary Examiner* — Esther B. Henderson
(74) *Attorney, Agent, or Firm* — Thomas Horstemeyer, LLP

(57) ABSTRACT

Provided are an authorized-login implementation method and device, an apparatus, a system, a platform and a storage medium. The method includes: receiving, by a first authorization plug-in bound to a first application client, an authorized-login request from a second authorization plug-in bound to a second application client, where the authorized-login request is used for a second application to request login by using a first application account; requesting, by the first authorization plug-in, to acquire an authorized-login code from an authorization service platform through authorization information about the first application account; and feeding back, by the first authorization plug-in, the authorized-login code to the second authorization plug-in, so as to instruct the second authorization plug-in to request to acquire a second application account from the authorization service platform according to the authorized-login code, where the second application account is used for accessing a user resource of the first application account.

20 Claims, 11 Drawing Sheets

(51) Int. Cl.
　　　 *G06F 16/958* 　　　(2019.01)
　　　 *G06F 9/54* 　　　(2006.01)

(56) References Cited

U.S. PATENT DOCUMENTS

2016/0269388 A1　9/2016　Ezell et al.
2018/0091490 A1　3/2018　Wang et al.

FOREIGN PATENT DOCUMENTS

| | | |
|---|---|---|
| CN | 105338005 A | 2/2016 |
| CN | 105656922 A | 6/2016 |
| CN | 106713315 A | 5/2017 |
| CN | 109598115 A | 4/2019 |

OTHER PUBLICATIONS

1st Search Report dated Sep. 24, 2019 for Chinese Patent Application No. 201810848030.6.
1st Office Action dated Oct. 8, 2019 for Chinese Patent Application No. 201810848030.6.

AUTHORIZED-LOGIN IMPLEMENTATION METHOD AND DEVICE, APPARATUS, SYSTEM, PLATFORM, AND STORAGE MEDIUM

CROSS REFERENCE TO RELATED APPLICATIONS

This is continuation of International Patent Application No. PCT/CN2019/096758, filed on Jul. 19, 2019, which is based on and claims priority to Chinese patent application No. 201810848030.6 filed with the CNIPA on Jul. 27, 2018, disclosures of which are incorporated herein by reference in their entireties.

TECHNICAL FIELD

Embodiments of the present disclosure relate to the field of network authorization technologies and, for example, relate to an authorized-login implementation method and device, an apparatus, a system, a platform and a storage medium.

BACKGROUND

With the development of the Internet and intelligent terminals, the number of applications (APPs) increases, and there is a demand for users to log in to one unregistered application using an account of another application. In the related art, such login is generally implemented through the open authorization (OAUTH) protocol. In this case, an application with a registered account is used as a platform (or a service provider), while an application without any registered account is used as a consumer.

The OAUTH protocol provides a secure, open and easy standard for the authorization of user resources in applications. At the same time, the consumer can use an OAUTH authentication service, and the service provider can implement its own OAUTH authentication service, so the OAUTH is open. Unlike previous authorization methods, the authorization through the OAUTH does not allow a consumer to reach user account information (such as a username and a password), that is, the consumer can apply for an authorization of the user resource without using the username and password of the user, so the OAUTH is secure.

The authorization process of the OAUTH requires an interaction token between a consumer and a service provider. However, the interaction process of the OAUTH has some defects, that is, there is a unidirectional authorization from the platform to the consumer. As the number of application types increases, more complex cross-licensing relationships may occur, and thus separate licensing program interfaces of the consumer and the platform need to be developed in various applications. Furthermore, unidirectional authorization relationships are relatively single, which cannot meet user requirements for flexible use of multiple application accounts.

SUMMARY

The present disclosure provides an authorized-login implementation method and device, an apparatus, a system, a platform and a storage medium, so as to optimize the authorized-login manner and make allowable authorization relationships more abundant and flexible.

In one embodiment, the present disclosure provides an authorized-login implementation method. The authorized-login implementation method includes steps described below.

A first authorization plug-in bound to a first application client receives an authorized-login request from a second authorization plug-in bound to a second application client, where the authorized-login request is used for a second application to request login by using a first application account.

The first authorization plug-in requests to acquire an authorized-login code from an authorization service platform through authorization information about the first application account.

The first authorization plug-in feeds back the authorized-login code to the second authorization plug-in, so as to instruct the second authorization plug-in to request to acquire a second application account from the authorization service platform according to the authorized-login code, the second application account is used for accessing a user resource of the first application account.

In one embodiment, the present disclosure further provides an authorized-login implementation method. The authorized-login implementation method includes steps described below.

A second authorization plug-in acquires an authorized-login request for performing login by using a first application account, the authorized-login request is transmitted by a second application client, and the second authorization plug-in is bound to the second application client.

The second authorization plug-in transmits the authorized-login request to a first authorization plug-in bound to a first application client, so as to request the first authorization plug-in to request to acquire an authorized-login code from an authorization service platform through authorization information about the first application account.

The second authorization plug-in receives the authorized-login code fed back by the first authorization plug-in.

The second authorization plug-in sends an account login request, which represents that authorization is successful, to the authorization service platform according to the authorized-login code, so as to request the authorization service platform to determine a second application account associated with the first application account according to the first application account in the account login request, and the second application account is used for acquiring a user resource corresponding to the first application account.

The second authorization plug-in receives the second application account fed back by the authorization service platform, and transmits the second application account to the second application client.

In one embodiment, the present disclosure further provides an authorized-login implementation method. The authorized-login implementation method includes steps described below.

An authorization service platform receives authorization information about a first application account sent by a first authorization plug-in, where the authorization information about the first application account is used for requesting to authorize a second application to perform login by using the first application account.

The authorization service platform performs verification of the authorization information about the first application account, and after the verification passes, feeds back an authorized-login code to the first authorization plug-in.

The authorization service platform receives an account login request, which represents that authorization is successful, sent by a second authorization plug-in.

The authorization service platform determines a second application account associated with the first application account according to the first application account in the account login request, and feeds back the second application account to the second authorization plug-in, where the second application account is used for the second application to log in to acquire a user resource corresponding to the first application account.

The first authorization plug-in is bound to a first application client, and the second authorization plug-in is bound to a second application client.

In one embodiment, the present disclosure further provides an authorized-login implementation device. The device is configured in a first authorization plug-in, and the first authorization plug-in is bound to a first application client. The device includes a request receiving module, a login code acquisition module, and a login code feedback module.

The request receiving module is configured to receive an authorized-login request from a second authorization plug-in bound to a second application client, where the authorized-login request is used for a second application to request login by using a first application account.

The login code acquisition module is configured to request to acquire an authorized-login code from an authorization service platform through authorization information about the first application account.

The login code feedback module is configured to feed back the authorized-login code to the second authorization plug-in, so as to instruct the second authorization plug-in to request to acquire a second application account from the authorization service platform according to the authorized-login code, and the second application account is used for accessing a user resource of the first application account.

In one embodiment, the present disclosure further provides an authorized-login implementation device. The device is configured in a second authorization plug-in, and the device includes a request acquisition module, a request transmission module, a login code receiving module, a request sending module, and an account receiving module.

The request acquisition module is configured to acquire an authorized-login request for performing login by using a first application account, the authorized-login request is transmitted by a second application client, and the second authorization plug-in is bound to the second application client.

The request transmission module is configured to transmit the authorized-login request to a first authorization plug-in bound to a first application client, so as to request the first authorization plug-in to request to acquire an authorized-login code from an authorization service platform through authorization information about the first application account.

The login code receiving module is configured to receive the authorized-login code fed back by the first authorization plug-in.

The request sending module is configured to send, to the authorization service platform, an account login request, which represents that authorization is successful. according to the authorized-login code, so as to request the authorization service platform to determine a second application account associated with the first application account according to the first application account in the account login request, and the second application account is used for acquiring a user resource corresponding to the first application account.

The account receiving module is configured to receive the second application account fed back by the authorization service platform, and transmit the second application account to the second application client.

In one embodiment, the present disclosure further provides an authorized-login implementation device. The device is configured in an authorization service platform and includes an authorization information receiving module, an authorization information verification module, a request receiving module, and an account determination module.

The authorization information receiving module is configured to receive authorization information about a first application account sent by a first authorization plug-in, where the authorization information about the first application account is used for requesting to authorize a second application to perform login by using the first application account.

The authorization information verification module is configured to perform verification of the authorization information about the first application account, and after the verification passes, feed back an authorized-login code to the first authorization plug-in.

The request receiving module is configured to receive an account login request, which represents that authorization is successful, sent by a second authorization plug-in.

The account determination module is configured to determine a second application account associated with the first application account according to the first application account in the account login request, and feed back the second application account to the second authorization plug-in, where the second application account is used for the second application to log in to acquire a user resource corresponding to the first application account; where the first authorization plug-in is bound to a first application client, and the second authorization plug-in is bound to a second application client.

In one embodiment, the present disclosure further provides a terminal. The terminal includes one or more processors and a memory.

The memory is configured to store one or more programs.

The one or more programs, when executed by the one or more processors, cause the one or more processors to implement the authorized-login implementation method applied to the first authorization plug-in or the authorized-login implementation method applied to the second authorization plug-in described in the embodiments of the present disclosure.

In one embodiment, the present disclosure further provides a service platform. The service platform includes one or more processors and a memory.

The memory is configured to store one or more programs.

The one or more programs, when executed by the one or more processors, cause the one or more processors to implement the authorized-login implementation method applied to the authorization service platform described in the embodiments of the present disclosure.

In one embodiment, the present disclosure further provides an authorized-login system. The authorized-login system includes a first terminal, a second terminal and a service platform.

The first terminal is configured to implement the method applied to the first authorization plug-in described above.

The second terminal is configured to implement the method applied to the second authorization plug-in described above.

The service platform is configured to implement the method applied to the authorization service platform described above.

In one embodiment, the present disclosure further provides a computer-readable storage medium configured to store a computer program which, when executed by a processor, implements the authorized-login implementation method described in the embodiments of the present disclosure.

DETAILED DESCRIPTION

Figure 1:
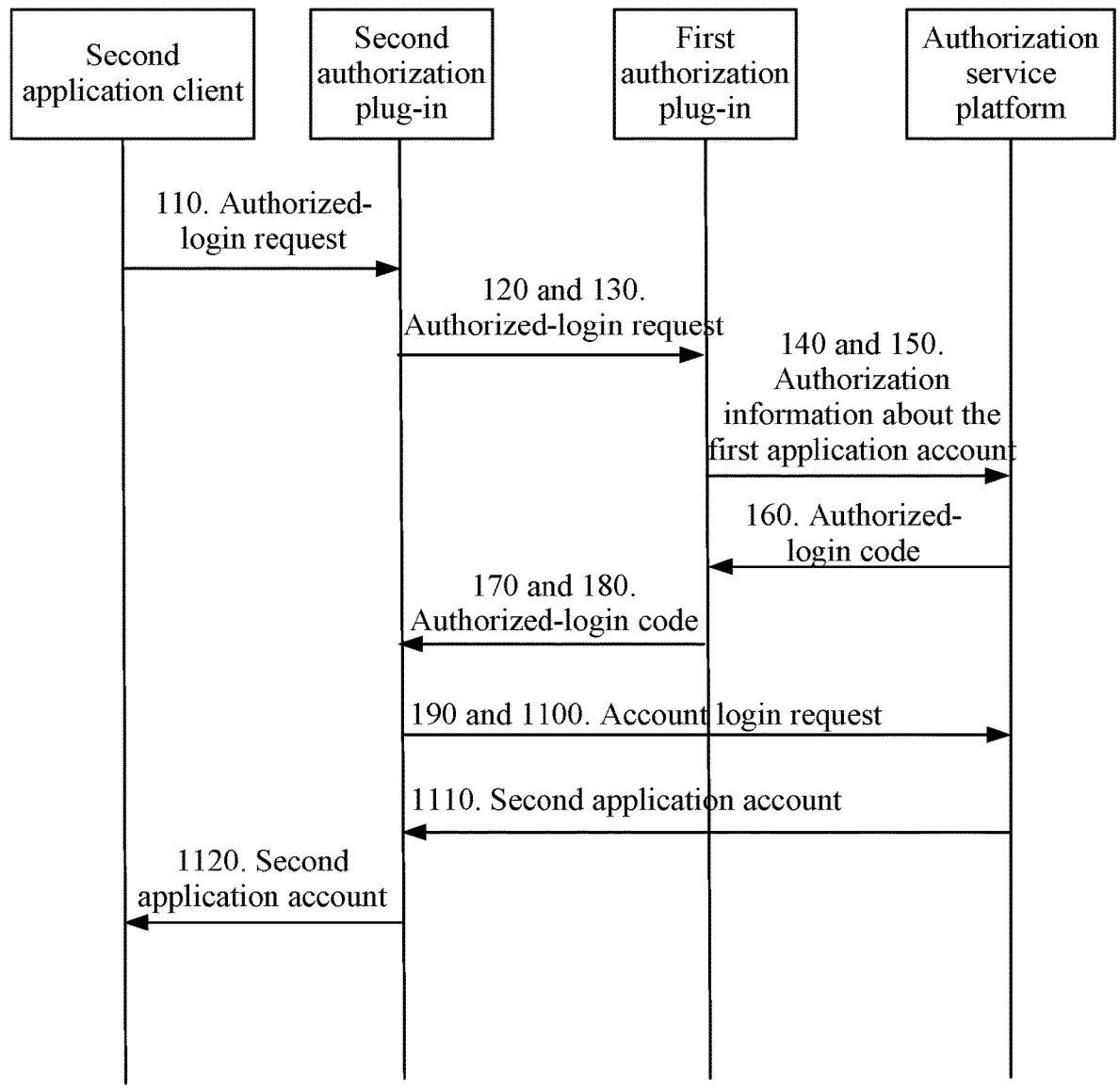
FIG. 1 is a flowchart of an authorized-login implementation method according to an embodiment one of the present disclosure.

The present disclosure is described below in conjunction with the drawings and embodiments. The embodiments described herein are merely intended to explain the present disclosure but not to limit the present disclosure.

For ease of description, only parts not all of structures related to the present disclosure are illustrated in the drawings. Before the exemplary embodiments are discussed in more detail, it is to be noted that part of the exemplary embodiments are described as processing or methods depicted in flowcharts. Although the flowcharts describe the operations (or steps) as sequentially processed, many of the operations may be implemented concurrently, coincidentally or simultaneously. Additionally, the sequence of the operations may be rearranged. The processing may be terminated when the operations are completed, but may further have additional steps not included in the drawings. Each of the processes may correspond to one of a method, a function, a procedure, a subroutine, a subprogram, etc.

Alternative features and examples are provided in each of multiple embodiments described below. Multiple features described in the embodiments can be combined to form multiple alternative schemes. Each numbered embodiment should not be regarded as only one scheme.

Embodiment One

FIG. 1 is a flowchart of an authorized-login implementation method according to the embodiment one of the present disclosure. This embodiment is suitable for implementing the authorized login. This method may be performed by an authorized-login implementation system. This system may include multiple authorization plug-ins bound to application clients respectively, and may further include one authorization service platform which may interact with each authorization plug-in. This embodiment will be described by taking an interaction process between the authorization service platform and both of a first authorization plug-in and a second authorization plug-in as an example. As shown in FIG. 1, the method includes the steps described below.

In step 110, a second authorization plug-in acquires an authorized-login request for performing login by using a first application account, the authorized-login request is transmitted by a second application client, and the second authorization plug-in is bound to the second application client.

The first application and the second application are applications installed on a terminal. The first application client is a program installed on the terminal for providing local services for users of the first application. The second application client is a program installed on the terminal for providing local services for users of the second application. The terminal may be a smart phone, or may be a laptop or a tablet.

When using the second application, the user chooses to log in by using the first application account or the second application account. When the user chooses to log in by using the first application account on an interface of the second application client, the second application client transmits the authorized-login request for performing login by using the first application account to the second authorization plug-in. The authorized-login request is used for the second application to request login by using the first application account. The second authorization plug-in acquires the authorized-login request for performing login by using the first application account and transmitted by the second application client.

Alternatively, the first authorization plug-in and the second authorization plug-in may be software development kit (SDK) plug-ins. The SDK plug-in refers to a toolkit for implementing a certain function of a software product. The first authorization plug-in and the second authorization plug-in are toolkits dedicated to implementing the authorized-login function.

The first authorization plug-in is bound to the first application client, and is configured to implement the authorized-login function of the first application by interacting with the second authorization plug-in and the authorization service platform. Alternatively, the first authorization plug-in may be integrated in the first application client software.

The second authorization plug-in is bound to the second application client, and is configured to implement the authorized-login function of the second application by interacting with the first authorization plug-in and the authorization service platform. Alternatively, the second authorization plug-in may be integrated in the second application client software.

The authorization service platform is a server that may provide authorized-login platform services for both the first application client and the second application client. The authorized-login platform services provided by the authorization service platform may enable the second application client to log in by using the first application account.

In step 120, the second authorization plug-in transmits the authorized-login request to the first authorization plug-in bound to the first application client, so as to request the first authorization plug-in to request to acquire an authorized-login code from the authorization service platform through the authorization information about the first application account.

The second authorization plug-in transmits the authorized-login request to the first authorization plug-in, and requests the first authorization plug-in to request to acquire the authorized-login code from the authorization service platform through the authorization information about the first application account. Generally, both application clients for implementing the authorized login are installed in terminals of users, so information interaction between these two authorization plug-ins may be realized through an operating system.

The authorization information about the first application account is information used for requesting to authorize the second application to log in by using the first application account. Alternatively, the authorization information about the first application account may be information generated based on account information about the first application account, including a user name and a user portrait.

The authorized-login code is an authentication code used for requesting to acquire the second application account from the authorization service platform. The second application account, which is determined by the authorization service platform according to the authorization information about the first application account, is an account associated with the first application account, and the second application account is used for accessing user resources of the first application account. The second application client may perform a login operation according to the second application account.

In step 130, the first authorization plug-in bound to the first application client receives the authorized-login request from the second authorization plug-in bound to the second application client, and the authorized-login request is used for the second application to request to perform login by using the first application account.

The first authorization plug-in bound to the first application client receives the authorized-login request from the second authorization plug-in bound to the second application client. The first authorization plug-in, according to the authorized-login request, determines that the second application requests for performing login by using the first application account.

In step 140, the first authorization plug-in requests to acquire the authorized-login code from the authorization service platform through the authorization information about the first application account.

After receiving the authorized-login request, the first authorization plug-in acquires the authorization information about the first application account. Alternatively, after the user logs in by using the first application account, the account information about the first application account is read, and the user name and user portrait in the account information are served as the authorization information about the first application account. Alternatively, the account information pre-stored in the first application client is read, and the user name and the user portrait in the account information are served as the authorization information about the first application account.

After acquiring the authorization information about the first application account, the first authorization plug-in transmits the authorization information about the first application account to the authorization service platform, and requests the authorized-login code from the authorization service platform through the authorization information about the first application account.

In step 150, the authorization service platform receives the authorization information about the first application account sent by the first authorization plug-in, where the authorization information about the first application account is used for requesting to authorize the second application to perform login by using the first application account.

The authorization service platform receives the authorization information about the first application account sent by the first authorization plug-in. The authorization service platform, according to the authorization information about the first application account, determines that the first application will authorize other applications to log in by using the first application account.

In step 160, the authorization service platform performs verification of the authorization information about the first application account, and after the verification passes, feeds back the authorized-login code to the first authorization plug-in.

The authorization service platform performs the verification of the authorization information about the first application account.

Alternatively, the authorization service platform may perform the verification of the authorization information locally, or may request a first application server to perform the verification of the authorization information through the first authorization plug-in. In one embodiment, the first application server corresponding to the first application negotiates with a second application server corresponding to the second application about an authorized-login permission, determines a protocol that the second application may log in by using the first application account, and the protocol may be sent to the authorization service platform for storage. The authorization service platform performs the verification of the authorization information locally according to the stored protocol. If the protocol that the second application may log in by using the first application account is stored in the authorization service platform, the verification passes. If the protocol that the second application may log in by using the first application account is not stored in the authorization service platform, the verification fails. Alternatively, the protocol may be stored in the first application server. The authorization service platform sends a verification request to the first application server through the first authorization plug-in, so as to request the first application server to perform the verification of the authorization information. The first application server performs the verification of the authorization information according to the stored protocol. If the protocol that the second application may log in by using the first application account is stored in the first application server, the verification passes, and verification pass information is sent to the authorization service platform through the first authorization plug-in. If the protocol that the second application may log in by using the first application account is not stored in the first application server, the verification fails, and verification failure information is sent to the authorization service platform through the first authorization plug-in.

In step 170, the first authorization plug-in feeds back the authorized-login code to the second authorization plug-in, so as to instruct the second authorization plug-in to request to acquire the second application account from the authorization service platform according to the authorized-login code, and the second application account is used for accessing a user resource of the first application account.

The first authorization plug-in feeds back the authorized-login code to the second authorization plug-in of the second application which requests to perform login by using the first application account, and instructs the second authorization plug-in to request to acquire the second application account from the authorization service platform according to the authorized-login code.

In step 180, the second authorization plug-in receives the authorized-login code fed back by the first authorization plug-in.

The authorized-login code is an authentication code used for requesting to acquire the second application account from the authorization service platform.

In step 190, the second authorization plug-in sends an account login request, which represents that authorization is successful, to the authorization service platform according to the authorized-login code, so as to request the authorization service platform to determine, according to the first application account in the account login request, the second application account associated with the first application account.

The second authorization plug-in generates the account login request, which represents the authorization is successful, according to the authorized-login code. The account login request, which represents that the authorization is successful, is used for notifying the authorization service platform that the first application authorizes the second application to perform login by using the first application account, so as to request the service platform to determine the associated second application account according to the first application account in the account login request.

In step 1100, the authorization service platform receives the account login request, which represents that the authorization is successful, sent by the second authorization plug-in.

The authorization service platform receives the account login request, which represents that the authorization is successful, sent by the second authorization plug-in. The authorization service platform, according to the account login request, determines that the first application authorizes the second application to perform login by using the first application account.

In step 1110, the authorization service platform determines the second application account associated with the first application account according to the first application account in the account login request, and feeds back the second application account to the second authorization plug-in.

The authorization service determines, according to the account information about the first application account in the account login request, the second application account associated with the first application account. The second application account is used for the second application to acquire a user resource corresponding to the first application account. Alternatively, the user resource includes a user name and a user portrait.

In step 1120, the second authorization plug-in receives the second application account fed back by the authorization service platform, and transmits the second application account to the second application client.

The second authorization plug-in receives the second application account fed back by the authorization service platform and transmits it to the second application client. The second application client performs the login operation according to the second application account.

After the second application client logs in by using the second application account, a login success interface is displayed on the second application client, a user name and user portrait displayed on this interface are the same as the user name and user portrait corresponding to the first application account.

Alternatively, the second application account and the first application account have different user identifiers. The user identifier is used for distinguishing the second application account from the first application account.

In this embodiment, the authorized login may be implemented by configuring authorization plug-ins respectively bound to application clients and a common authorization service platform when an application account needs to be authorized for login, which can be implemented by means of interactions between the authorization plug-ins and the authorization service platform. The above scheme does not need to separately develop related authorized login subprograms during the development of application clients, and instead, it is implemented through general-purpose plug-ins. Furthermore, the authorization service platform can provide peer-to-peer authorization services between different authorization plug-ins and preconditions and guarantees for implementing the bidirectional authorization. Therefore, the user requirements for flexible use of various application accounts can be satisfied, and the authorization login interaction between various applications can be implemented on the basis of authorization login interaction between various applications and the authorization service platform through general-purpose plug-ins, so as to optimize the authorized-login manner and make allowable authorization relationships more abundant and flexible.

Embodiment Two

Figure 2:
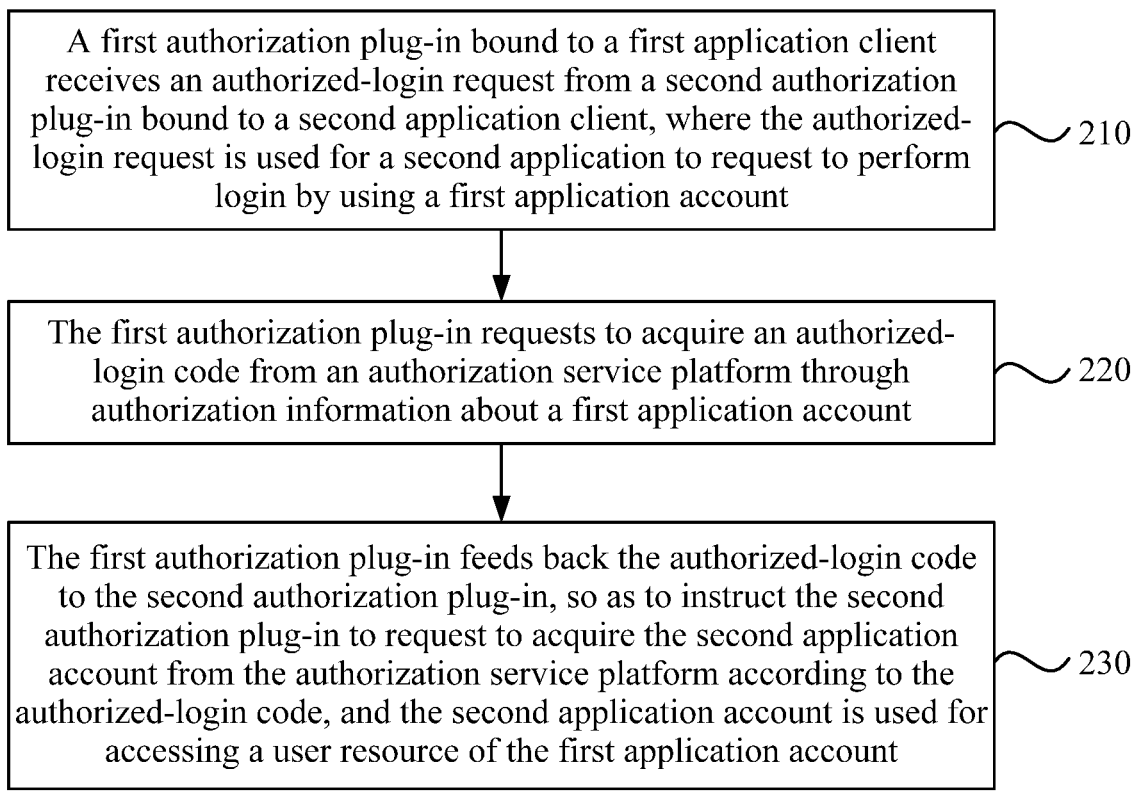
FIG. 2 is a flowchart of an authorized-login implementation method according to an embodiment two of the present disclosure.

FIG. 2 is a flowchart of an authorized-login implementation method according to the embodiment two of the present disclosure. This embodiment is suitable for the implementation of the authorized login between different applications. The method may be applied to a first authorization plug-in and is performed by an authorized-login implementation device. The device may be implemented by software and/or hardware and may generally be integrated in a terminal. The method includes steps described below.

In step 210, a first authorization plug-in bound to a first application client receives an authorized-login request from a second authorization plug-in bound to a second application client, where the authorized-login request is used for a second application to request login by using a first application account.

In step 220, the first authorization plug-in requests to acquire an authorized-login code from an authorization service platform through authorization information about the first application account.

After receiving the authorized-login request, the first authorization plug-in acquires the authorization information about the first application account. Alternatively, after the user logs in by using the first application account, account information about the first application account is read, and this account information is served as the authorization information about the first application account. Alternatively, account information pre-stored in the first application client is read or the user inputs the account information, and this account information is served as the authorization information about the first application account.

In step 230, the first authorization plug-in feeds back the authorized-login code to the second authorization plug-in, so as to instruct the second authorization plug-in to request to acquire the second application account from the authorization service platform according to the authorized-login code, and the second application account is used for accessing a user resource of the first application account.

The first authorization plug-in feeds back the authorized-login code to the second authorization plug-in of the second application which requests login by using the first application account, and instructs the second authorization plug-in to request the second application account from the authorization service platform according to the authorized-login code.

In the scheme of this embodiment, the first authorization plug-in bound to the first application client receives the authorized-login request from the second authorization plug-in bound to the second application client, requests to acquire the authorized-login code from the authorization service platform through the authorization information about the first application account, and feeds back the authorized-login code to the second authorization plug-in to instruct the second authorization plug-in to request to acquire the second application account from the authorization service platform according to the authorized-login code, and the second application account is used for accessing the user resource of the first application account. Therefore, an application can authorize other applications to perform login by using an account of this application through general-purpose plug-ins.

Embodiment Three

Figure 3:
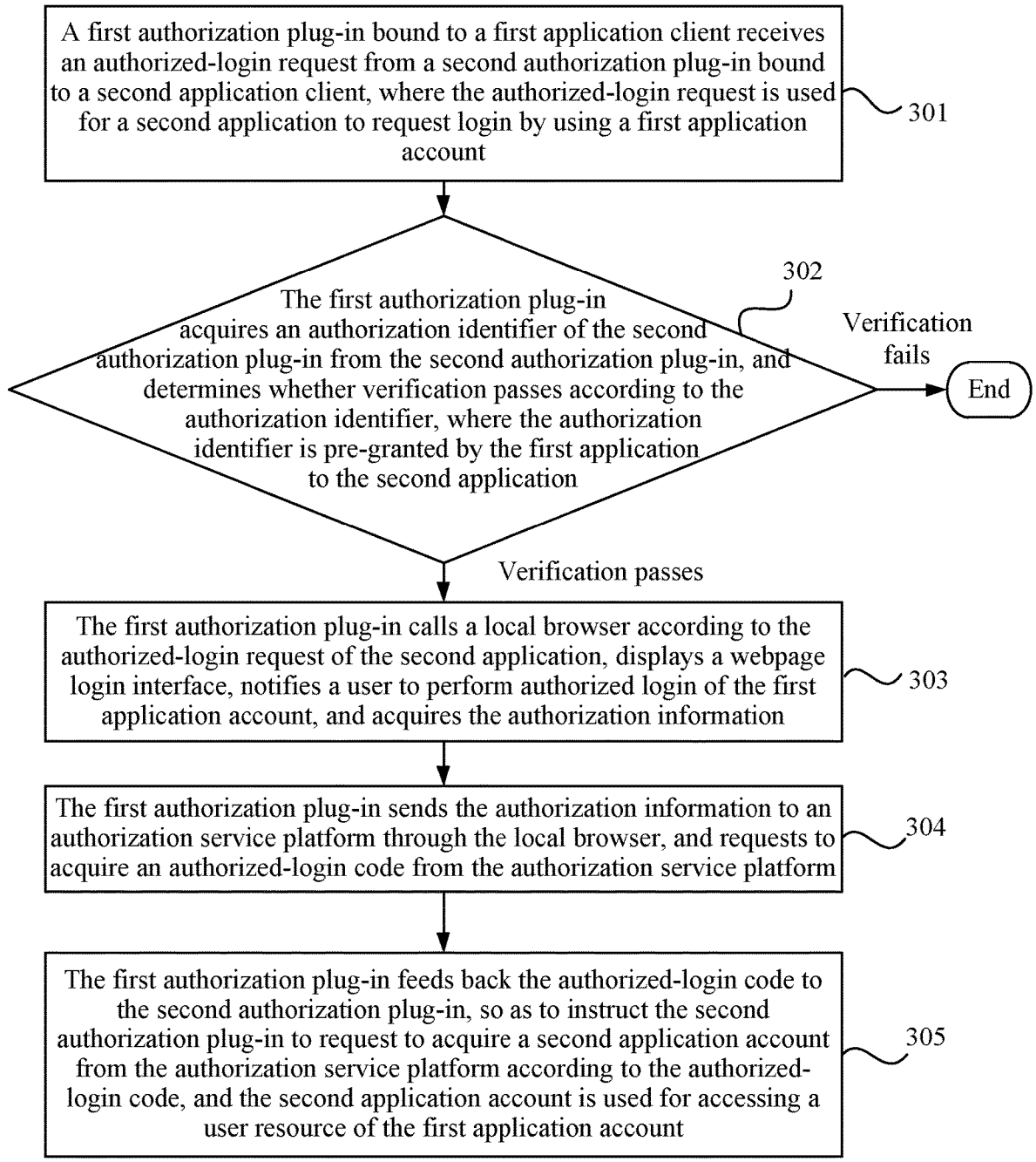
FIG. 3 is a flowchart of an authorized-login implementation method according to an embodiment three of the present disclosure.

FIG. 3 is a flowchart of an authorized-login implementation method according to the embodiment three of the present disclosure. This embodiment may be combined with alternative schemes in the foregoing embodiments. In this embodiment, before the first authorization plug-in requests to acquire the authorized-login code from the authorization service platform through the authorization information about the first application account, the method further includes a step described below, the first authorization plug-in acquires an authorization identifier of the second authorization plug-in from the second authorization plug-in, where the authorization identifier is pre-authorized by the first application to the second application. The step in which the first authorization plug-in requests to acquire the authorized-login code from the authorization service platform through the authorization information about the first application account includes a step described below, when the authorization identifier passes verification from the first authorization plug-in, the first authorization plug-in requests to acquire the authorized-login code from the authorization service platform through the authorization information about the first application account.

Alternatively, the step in which the first authorization plug-in requests to acquire the authorized-login code from the authorization service platform through the authorization information about the first application account includes steps described below, the first authorization plug-in calls a local browser according to the authorized-login request of the second application, displays a webpage login interface, notifies a user to perform authorized login of the first application account, and acquires the authorization information; and the first authorization plug-in sends the authorization information to the authorization service platform through the local browser, and requests to acquire the authorized-login code from the authorization service platform.

As shown in FIG. 3, the method includes steps described below.

In step 301, the first authorization plug-in bound to the first application client receives an authorized-login request from the second authorization plug-in bound to the second application client, and the authorized-login request is used for the second application to request login by using the first application account.

In step 302, the first authorization plug-in acquires the authorization identifier of the second authorization plug-in from the second authorization plug-in, and determines whether verification passes according to the authorization identifier; if the verification passes, step 303 is executed; if the verification fails, step 303 is no longer executed and the procedure ends; where the authorization identifier is pre-granted by the first application to the second application.

A server corresponding to the first application negotiates with a server corresponding to the second application about the authorized-login permission, determines a protocol that the second application may log in by using the first application account, and generates the authorization identifier according to this protocol. The authorization identifier is stored in the first application, and may be transmitted by the second application client to the second authorization plug-in.

Before requesting to acquire the authorized-login code from the authorization service platform through the authorization information about the first application account, the first authorization plug-in acquires the authorization identifier of the second authorization plug-in from the second authorization plug-in, determines, according to the authorization identifier, that it is the second application which requests the authorized login, and verifies whether the protocol that the second application may log in by using the first application account exists. If the first authorization plug-in verifies the existence of the protocol that the second application may log in by using the first application account, the verification passes, and the operation of step 303 is executed. If the first authorization plug-in verifies the inexistence of the protocol that the second application may log in by using the first application account, then the verification fails, the operation of step 303 is no longer executed, and the procedure ends.

In step 303, the first authorization plug-in calls a local browser according to the authorized-login request of the second application, displays a webpage login interface, notifies a user to perform authorized login of the first application account, and acquires the authorization information.

The first authorization plug-in calls the local browser of a terminal where the first application client is located, and displays the webpage login interface through the local browser to notify the user to perform the authorized login of the first application account. The webpage login interface contains login prompt information, which is used for prompting the user to input login information corresponding to the first application account into a specified area of the webpage login interface. Alternatively, the login information includes a user name and a login password which correspond to the first application account.

The user inputs the login information corresponding to the first application account. After the first application account is logged in, the first authorization plug-in acquires the account information about the first application account, and serves a user name and a user portrait in the account information as the authorization information about the first application account.

In step 304, the first authorization plug-in sends the authorization information to the authorization service platform through the local browser, and requests to acquire the authorized-login code from the authorization service platform.

While the first authorization plug-in acquires the authorization information through the webpage login interface of the local browser, the webpage login interface further acquires a uniform resource locator (URL) address, that is, an interface URL address, of an interface of the authorization service platform. Information may be transmitted to the authorized service platform through the interface URL address. After the first authorization plug-in acquires the authorization information, the first authorization plug-in sends the authorization information to the authorization service platform through the local browser according to the interface UCL address, and requests to acquire the authorized-login code from the authorization service platform.

In step 305, the first authorization plug-in feeds back the authorized-login code to the second authorization plug-in, so as to instruct the second authorization plug-in to request to acquire the second application account from the authorization service platform according to the authorized-login code, and the second application account is used for accessing the user resource of the first application account.

In the scheme of this embodiment, the first authorization plug-in acquires the authorization identifier of the second authorization plug-in from the second authorization plug-in, and after the verification passes, subsequent operations are performed, the authorization identifier is pre-authorized to the second application by the first application; the first authorization plug-in calls the local browser according to the authorized-login request of the second application, and displays the webpage login interface, so as to notify the user to perform authorized login of the first application account to acquire the authorization information; and the first authorization plug-in sends the authorization information to the authorization service platform through the local browser. In this way, the authorization verification can be performed according to the pre-configured authorization identifier, and the authorization information can be acquired according to the user login operation, thereby improving the account security in the authorized login process and protecting the user privacy.

Embodiment Four

Figure 4:
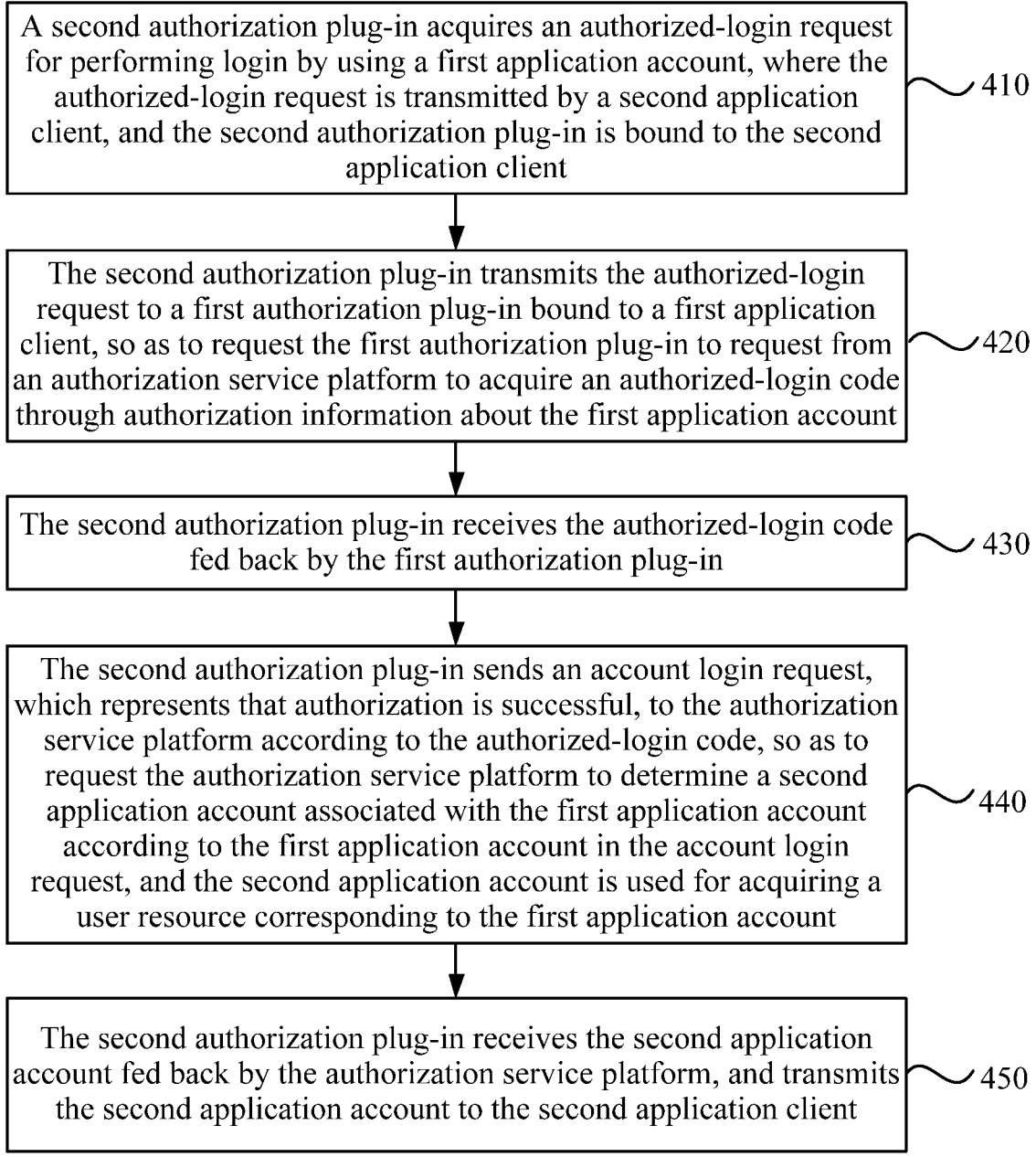
FIG. 4 is a flowchart of an authorized-login implementation method according to an embodiment four of the present disclosure.

FIG. 4 is a flowchart of an authorized-login implementation method according to the embodiment four of the present disclosure. This embodiment is suitable for the implementation of the authorized login between different applications. The method may be applied to a second authorization plug-in and is performed by an authorized-login implementation device. The device may be implemented by software and/or hardware and may generally be integrated in a terminal. The method includes steps described below.

In step 410, a second authorization plug-in acquires an authorized-login request for performing login by using a first application account, where the authorized-login request is transmitted by a second application client, and the second authorization plug-in is bound to the second application client.

When using a second application, the user chooses to log in by using the first application account or the second application account. When the user chooses to perform login by using the first application account on an interface of the second application client, the second application client transmits the authorized-login request for performing login by using the first application account to the second authorization plug-in. The authorized-login request is used for the second application to request login by using the first application account. The second authorization plug-in acquires the authorized-login request for performing login through the first application, and this authorized-login request is transmitted by the second application client.

In step 420, the second authorization plug-in transmits the authorized-login request to a first authorization plug-in bound to a first application client, so as to request the first authorization plug-in to request to acquire an authorized-login code from an authorization service platform through authorization information about the first application account.

The second authorization plug-in transmits the authorized-login request to the first authorization plug-in, and requests the first authorization plug-in to request to acquire the authorized-login code from the authorization service platform through the authorization information about the first application account.

The authorization information about the first application account is information used for requesting to authorize the second application to log in. Alternatively, the authorization information about the first application account may be account information about the first application account, including a user name and a user portrait. The authorized-login code is an authentication code used for requesting to acquire the second application account from the authorization service platform.

In step 430, the second authorization plug-in receives the authorized-login code fed back by the first authorization plug-in.

The authorized-login code is an authentication code that is used for requesting to acquire the second application account from the authorization service platform.

In step 440, the second authorization plug-in sends an account login request, which represents that authorization is successful, to the authorization service platform according to the authorized-login code, so as to request the authorization service platform to determine a second application account associated with the first application account according to the first application account in the account login request, and the second application account is used for acquiring the user resource corresponding to the first application account.

The second authorization plug-in generates the account login request, which represents that the authorization is successful, according to the authorized-login code. The account login request, which represents that the authorization is successful, is used for notifying the authorization service platform that the first application authorizes the second application to perform login by using the first application account, so as to request the service platform to determine the associated second application account according to the first application account in the account login request.

In step 450, the second authorization plug-in receives the second application account fed back by the authorization service platform, and transmits the second application account to the second application client.

The second authorization plug-in receives the second application account fed back by the authorization service platform and transmits it to the second application client. The second application client performs the login operation according to the second application account. After the second application client logs in by using the second application account, a login success interface is displayed on the second application client, a user name and user portrait displayed on this interface are the same as the user name and user portrait corresponding to the first application account.

Alternatively, the second application account and the first application account have different user identifiers. The user identifier is used for distinguishing the second application account from the first application account.

In the scheme of this embodiment, the second authorization plug-in acquires the authorized-login request for performing login by using the first application account, the authorized-login request is transmitted by the second application client, and the second authorization plug-in is bound to the second application client, transmits the authorized-login request to the first authorization plug-in bound to a first application client, receives the authorized-login code fed back by the first authorization plug-in, then sends the account login request, which represents that the authorization is successful, to the authorization service platform according to the authorized-login code, receives the second application account fed back by the authorization service platform, and transmits the second application account to the second application client to perform login operations. Therefore, an application can acquire a login authorization of other application through general-purpose plug-ins, and performs the login by using an account of other application.

Embodiment Five

Figure 5:
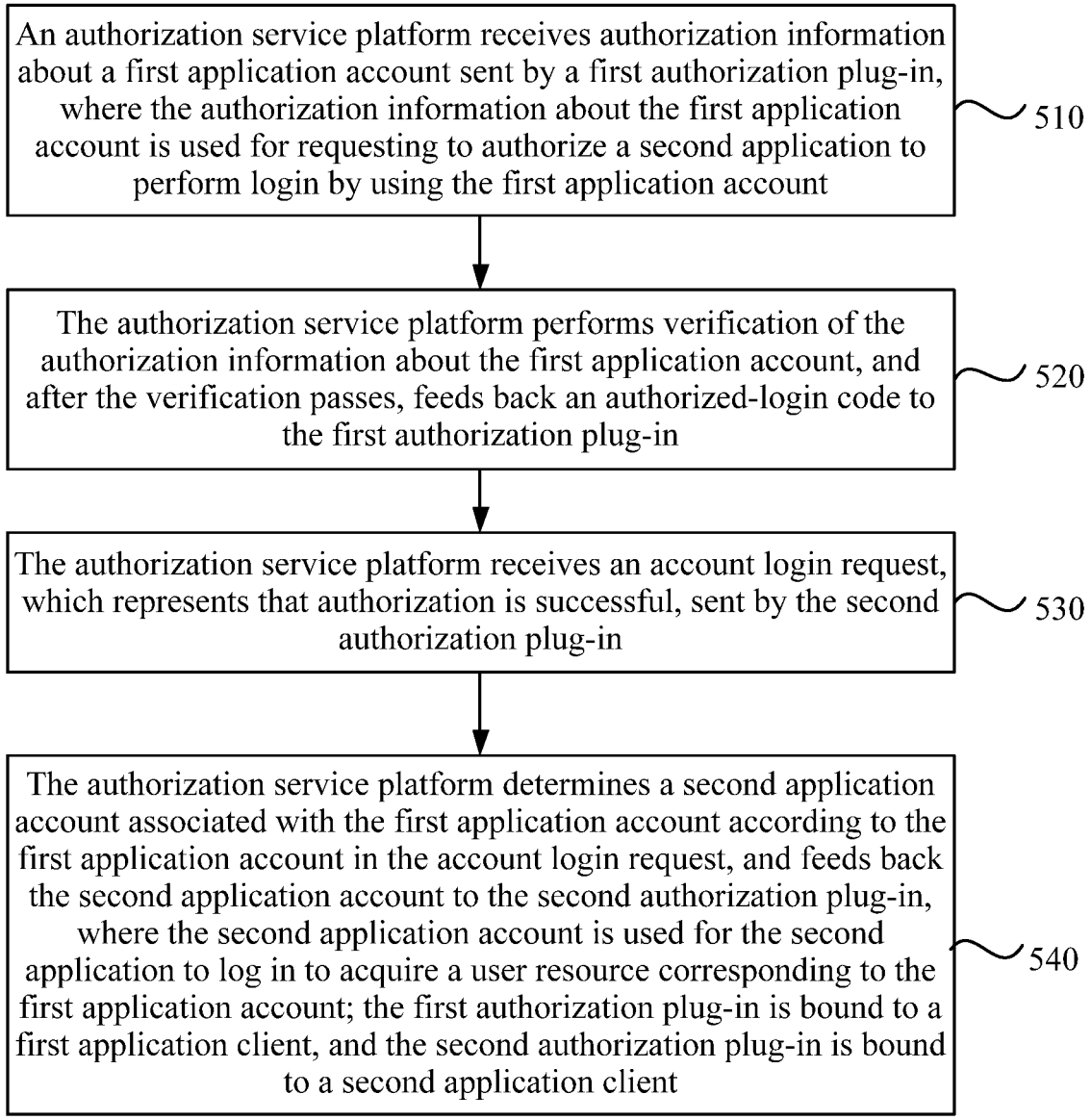
FIG. 5 is a flowchart of an authorized-login implementation method according to an embodiment five of the present disclosure.

FIG. 5 is a flowchart of an authorized-login implementation method according to the embodiment five of the present disclosure. This embodiment is suitable for the implementation of the authorized login between different applications. The method may be applied to an authorization service platform and is performed by an authorized-login implementation device.

The device may be implemented by software and/or hardware and may generally be integrated in a terminal. The method includes steps described below.

In step 510, the authorization service platform receives authorization information about a first application account sent by a first authorization plug-in, where the authorization information about the first application account is used for requesting to authorize a second application to perform login by using the first application account.

The authorization service platform receives the authorization information about the first application account sent by the first authorization plug-in. The authorization service platform, according to the authorization information about the first application account, determines that the first application is to authorize other application to log in by using the first application account.

In step 520, the authorization service platform performs verification of the authorization information about the first application account, and after the verification passes, feeds back an authorized-login code to the first authorization plug-in.

The authorization service platform performs the verification of the authorization information about the first application account.

Alternatively, the authorization service platform generates an authorization qualification code according to the authorization information about the first application account, and sends the authorization qualification code to the first authorization plug-in. The first authorization plug-in determines whether to perform the login authorization according to the authorization qualification code. If the first authorization plug-in determines to perform the login authorization, a preset authorization success code is fed back to the authorization service platform. If the first authorization plug-in determines not to perform the login authorization, a preset authorization failure code is fed back to the authorization service platform.

After receiving the authorization success code, the authorization service platform determines that the verification passes, and feeds back the authorized-login code to the first authorization plug-in, so as to transmit the authorized-login code to the second authorization plug-in. After receiving the authorization failure code, the authorization service platform determines that the verification fails, and no longer performs any further operation.

In step 530, the authorization service platform receives an account login request, which represents that authorization is successful, sent by the second authorization plug-in.

The authorization service platform receives the account login request, which represents that the authorization is successful, sent by the second authorization plug-in. The authorization service platform, according to the account login request, determines that the first application authorizes the second application to perform login by using the first application account.

In step 540, the authorization service platform determines, according to the first application account in the account login request, a second application account associated with the first application account, and feeds back the second application account to the second authorization plug-in, where the second application account is used for the second application to log in to acquire a user resource corresponding to the first application account; and the first authorization plug-in is bound to the first application client, and the second authorization plug-in is bound to the second application client.

The authorization service determines the second application account associated with the first application account according to the account information about the first application account in the account login request. The second application account is used for the second application to log in to acquire the user resource corresponding to the first application account. Alternatively, the user resource includes a user name and a user portrait.

In the scheme of this embodiment, the authorization service platform receives the authorization information about the first application account sent by the first authorization plug-in, where the authorization information about the first application account is used for requesting to authorize the second application to perform login by using the first application account; performs the verification of the authorization information, and after the verification passes, feeds back the authorized-login code to the first authorization plug-in, so as to transmit the authorized-login code to the second authorization plug-in; determines the second application account associated with the first application account according to the account login request, which represents that the authorization is successful, sent by the second authorization plug-in, and feeds back the second application account to the second authorization plug-in, where the second application account is used for the second application to log in to acquire a user resource corresponding to the first application account. In this way, multiple applications can acquire the login authorization of other applications and perform the login by using an account of the other applications.

Embodiment Six

Figure 6:
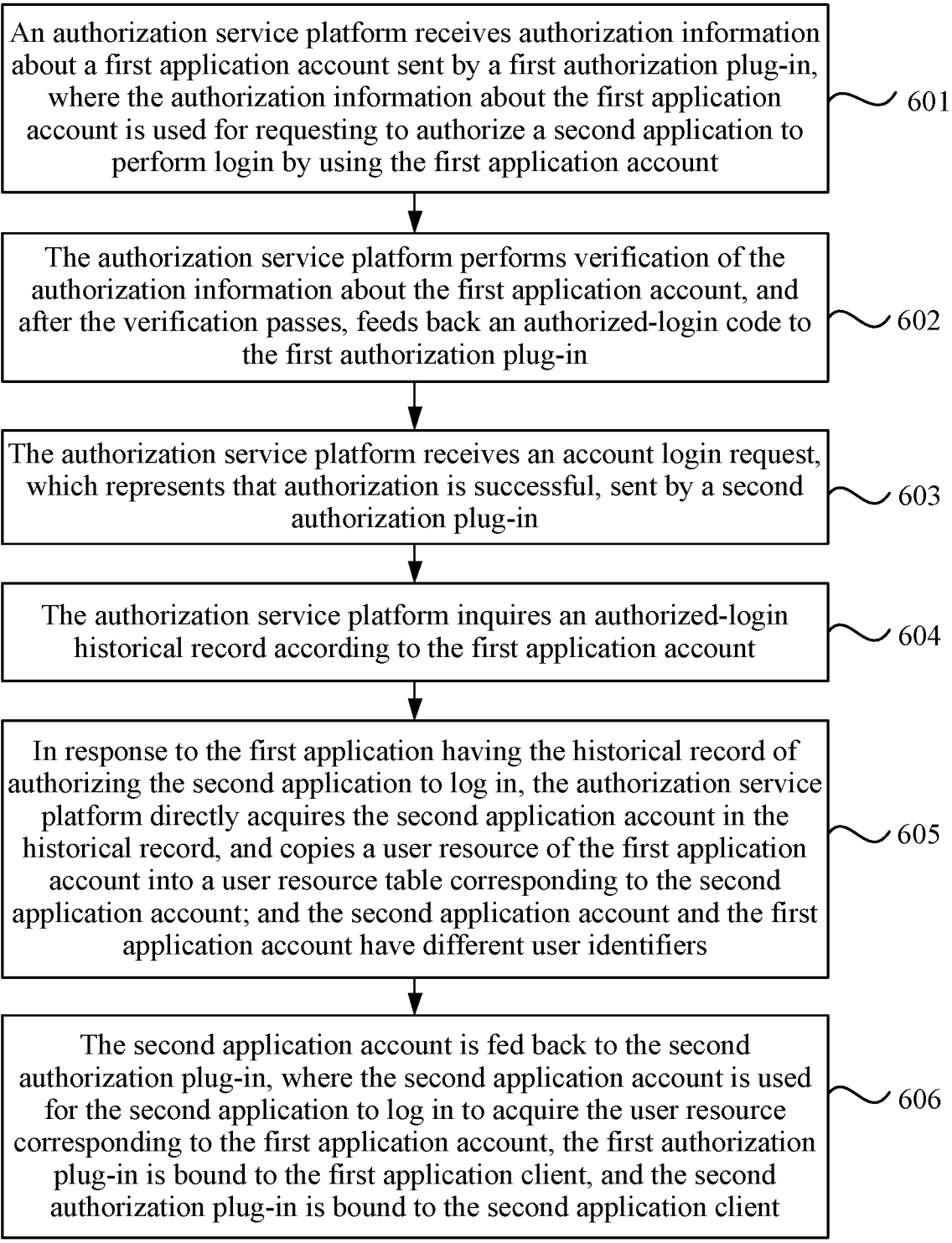
FIG. 6 is a flowchart of an authorized-login implementation method according to an embodiment six of the present disclosure.

FIG. 6 is a flowchart of an authorized-login implementation method according to the embodiment six of the present disclosure. This embodiment may be combined with alternative schemes in the foregoing embodiments. In this embodiment, after the associated second application account is determined, the method further includes a step described below, the authorization service platform copies a user resource of the first application account into a user resource table corresponding to the second application account, and the second application account and the first application account have different user identifiers.

Alternatively, the step in which the authorization service platform determines the second application account associated with the first application account according to the first application account in the account login request, and transmits the second application account to the second authorization plug-in includes steps described below.

The authorization service platform inquires an authorized-login historical record according to the first application account; and if the first application has a historical record of authorizing the second application to log in, the authorization service platform directly acquires the second application account in the historical record, and feeds back the second application account to the second authorization plug-in.

As shown in FIG. 6, the method includes steps described below.

In step 601, the authorization service platform receives the authorization information about the first application account sent by the first authorization plug-in, where the authorization information about the first application account is used for requesting to authorize the second application to perform login by using the first application account.

In step 602, the authorization service platform performs verification of the authorization information about the first application account, and after the verification passes, feeds back an authorized-login code to the first authorization plug-in.

In step 603, the authorization service platform receives an account login request, which represents that authorization is successful, sent by a second authorization plug-in.

In step 604, the authorization service platform inquires an authorized-login historical record according to the first application account.

The authorized-login historical record is a historical record which records information related to performing authorized login by an application. The authorized-login historical record includes an account of each application in the authorization service platform and corresponding associated application accounts for performing authorized login. The authorization service platform receives the authorization information about the first application account, and inquires the authorized-login historical record corresponding to the first application account according to the authorization information.

In step 605, in response to the first application having a historical record of authorizing the second application to log in, the authorization service platform directly acquires the second application account in the historical record, and copies a user resource of the first application account into a user resource table corresponding to the second application account, and the second application account and the first application account have different user identifiers.

If it is determined, in the authorized-login historical record corresponding to the first application account, that the first application has a historical record in which the first application is authorized by the second application to log in, that is, a historical record where the first application requests to perform login by using the second application account is inquired, which indicates that the first application has authorized the second application to log in and that the second application account used for the authorized login of the first application is stored in the first application, in this case, the authorization service platform directly acquires the second application account in the historical record, and feeds back the second application account to the second authorization plug-in, so as to end the authorized login procedure. That is, the authorization service platform may reverse query on the authorized login, and if the authorization service platform has inquired that the first application has the historical record where the first application is authorized by the second application to log in, the authorization service platform may directly determine that the second application is authorized by the first application to log in.

After the authorization service platform directly acquires the second application account in the historical record, the authorization service platform copies the user resource of the first application account into the user resource table corresponding to the second application account, so as to ensure that the first application account and the second application account share the same user resource, such that after the second application client logs in by using the second application account, the user name and user portrait displayed on the login success interface are same as the user name and user portrait corresponding to the first application account.

In this way, by copying the user resource of the first application account into the user resource table corresponding to the second application account, and the second application account and the first application account have different user identifiers, it can be ensure that the application account for authorizing login and the application account to be authorized to log in share the same user resource.

The second application account and the first application account have different user identifiers. The user identifier is used for distinguishing the second application account from the first application account.

In step 606, the second application account is fed back to the second authorization plug-in, where the second application account is used for the second application to log in to acquire the user resource corresponding to the first application account; and the first authorization plug-in is bound to the first application client, and the second authorization plug-in is bound to the second application client.

The second authorization plug-in transmits the second application account to the second application client. The second application client performs a login operation according to the second application account. Since the second application account is an account associated with the first application account, after the second application client logs in by using the second application account, the second application client may acquire user resources corresponding to the associated first application account.

Alternatively, the authorization service platform directly acquires the second application account in the historical record and feeds back the second application account to the first authorization plug-in, and the first authorization plug-in continues to feed back the second application account to the second authorization plug-in, so as to end the authorized login procedure.

Therefore, the authorization service platform inquires the authorized-login historical record according to the first application account, and if the first application has a historical record where the first application is authorized by the second application to log in, the authorization service platform directly acquires the second application account in the historical record, and feeds back the second application account to the second authorization plug-in, to end the authorized login procedure. In this way, the reverse query can be performed on the authorized login, and the login can be directly authorized according to the authorized-login historical record.

Embodiment Seven

Figure 7:
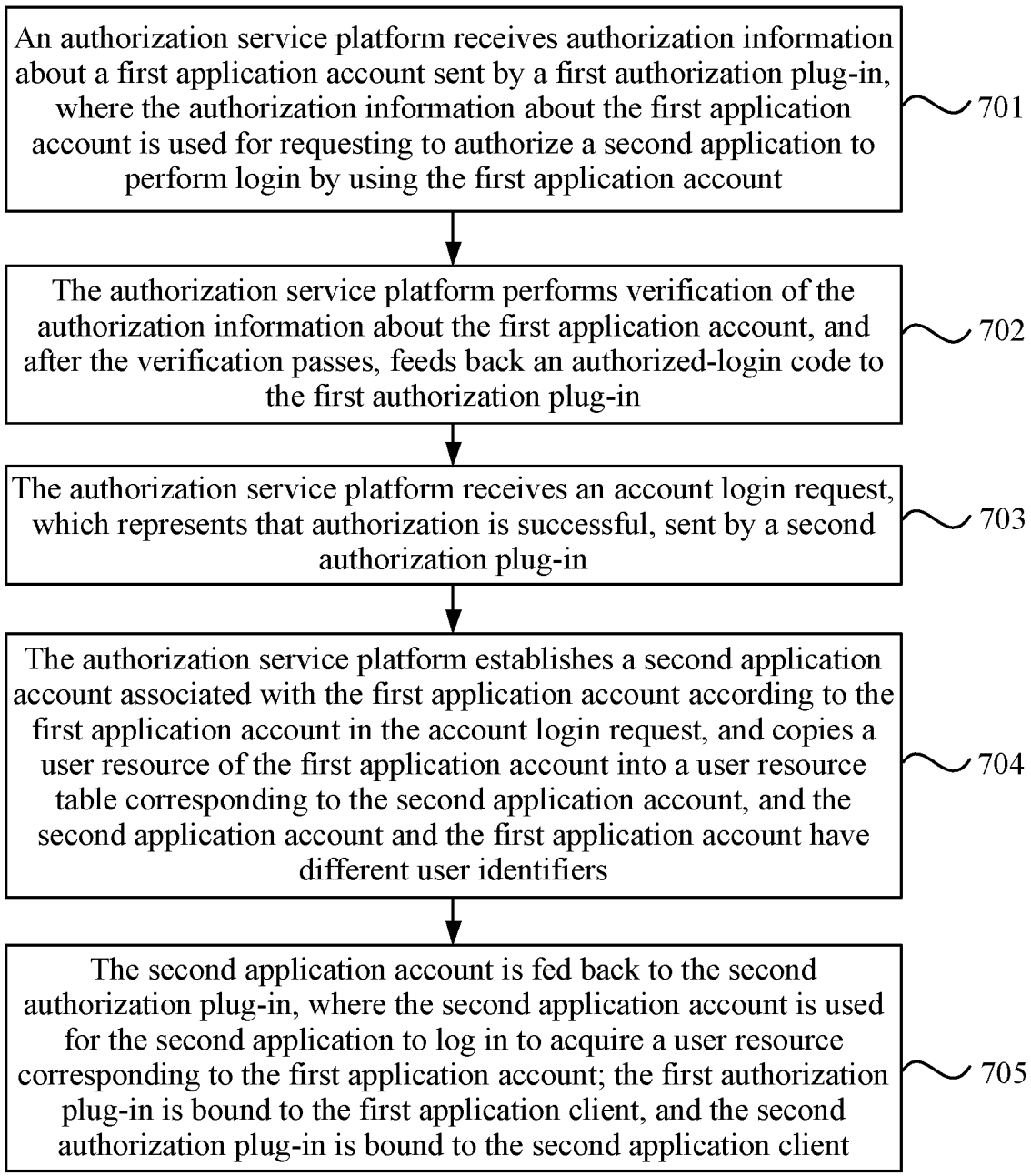
FIG. 7 is a flowchart of an authorized-login implementation method according to an embodiment seven of the present disclosure.

FIG. 7 is a flowchart of an authorized-login implementation method according to the embodiment seven of the present disclosure. In this embodiment, the step in which the authorization service platform determines the second application account associated with the first application account according to the first application account in the account login request, and feeds back the second application account to the second authorization plug-in may include following steps: the authorization service platform establishes the second application account associated with the first application account according to the first application account in the account login request, and feeds back the second application account to the second authorization plug-in.

Alternatively, after the associated second application account is determined, the method may further include a following step: the authorization service platform copies a user resource of the first application account into a user resource table corresponding to the second application account, and the second application account and the first application account have different user identifiers.

As shown in FIG. 7, the method includes steps described below.

In step 701, the authorization service platform receives authorization information about the first application account sent by the first authorization plug-in, where the authorization information about the first application account is used for requesting to authorize the second application to perform login by using the first application account.

In step 702, the authorization service platform performs verification of the authorization information about the first application account, and after the verification passes, feeds back the authorized-login code to the first authorization plug-in.

In step 703, the authorization service platform receives the account login request, which represents that authorization is successful, sent by a second authorization plug-in.

In step 704, the authorization service platform establishes the second application account associated with the first application account according to the first application account in the account login request, and copies the user resource of the first application account into the user resource table corresponding to the second application account, and the second application account and the first application account have different user identifiers.

The first application account and the second application account have corresponding user resource tables, which are used for storing user resources. Alternatively, the user resources include a user name and a user portrait. After the authorization service platform establishes the associated second application account according to the first application account in the account login request, the authorization service platform copies the user resource of the first application account into the user resource table corresponding to the second application account, so as to ensure that the first application account and the second application account share the same user resource, such that after the second application client logs in by using the second application account, the user name and user portrait displayed on the login success interface are the same as the user name and user portrait corresponding to the first application account.

Therefore, after the authorization service platform receives the account login request, which represents that the authorization is successful, sent by the second authorization plug-in, the authorization service platform directly establishes the second application account associated with the first application account according to the first application account in the account login request, and feeds back the second application account to the second authorization plug-in.

Alternatively, before the authorization service platform establishes the associated second application account according to the first application account in the account login request, the method may further include steps described below, the authorization service platform inquires an authorized login historical record according to the first application account; and if a historical record where the first application is authorized by the second application to log in does not exist, the authorization service platform establishes the second application account associated with the first application account according to the first application account in the account login request, and feeds back the second application account to the second authorization plug-in.

After the authorization service platform receives the account login request, which represents that the authorization is successful, sent by the second authorization plug-in, the authorization service platform performs the reverse query on the authorized login, that is, the authorization service platform inquires the authorized-login historical record according to the first application account. If the authorization service platform inquires that no historical record where the first application is authorized by the second application to log in exists, which indicates that the first application has not authorized the second application to log in and the second application account used for the authorized login of the first application is not stored in the first application, then the authorization service platform establishes the second application account associated with the first application account according to the first application account in the account login request.

Therefore, the authorization service platform inquires the authorized-login historical record according to the first application account, and if the historical record where the first application authorizes the second application to log in does not exist, the authorization service platform establishes the second application account associated with the first application account according to the first application account in the account login request, so the reverse query may be performed on the authorized login, and an account used for performing the authorized login may be established when it is determined that the first application has not authorized the second application to log in and the second application account used for the authorized login of the first application is not stored in the first application.

In step 705, the second application account is fed back to the second authorization plug-in, where the second application account is used for the second application to log in to acquire a user resource corresponding to the first application account; and the first authorization plug-in is bound to the first application client, and the second authorization plug-in is bound to the second application client.

The second authorization plug-in transmits the second application account to the second application client. The second application client performs a login operation according to the second application account. Since the second application account is an account associated with the first application account, after the second application client logs in by using the second application account, the second application client can acquire the user resource corresponding to the associated first application account.

Embodiment Eight

Figure 8:
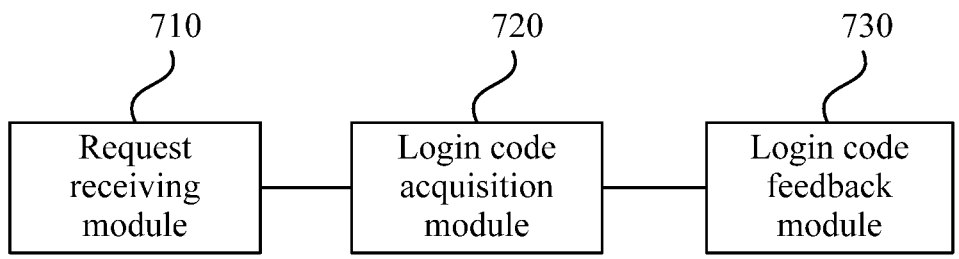
FIG. 8 is a structural diagram of an authorized-login implementation device according to an embodiment eight of the present disclosure.

FIG. 8 is a structural diagram of an authorized-login implementation device according to the embodiment eight of the present disclosure. This embodiment is suitable for the implementation of the authorized login between different applications. The device is configured in a first authorization plug-in bound to a first application client. The first authorization plug-in may be implemented by software and/or hardware and may generally be integrated in a terminal. As shown in FIG. 8, the device includes a request receiving module 710, a login code acquisition module 720, and a login code feedback module 730.

The request receiving module 710 is configured to receive an authorized-login request from a second authorization plug-in bound to a second application client, where the authorized-login request is used for a second application to request to perform login by using a first application account. The login code acquisition module 720 is configured to request to acquire an authorized-login code from an authorization service platform through authorization information about the first application account. The login code feedback module 730 is configured to feed back the authorized-login code to the second authorization plug-in, so as to instruct the second authorization plug-in to request to acquire a second application account from the authorization service platform according to the authorized-login code, and the second application account is used for accessing a user resource of the first application account.

In the scheme of this embodiment, the first authorization plug-in bound to the first application client receives the authorized-login request from the second authorization plug-in bound to the second application client, requests to acquire the authorized-login code from the authorization service platform through the authorization information about the first application account, and feeds back the authorized-login code to the second authorization plug-in so as to instruct the second authorization plug-in to request to acquire the second application account from the authorization service platform according to the authorized-login code, and the second application account is used for accessing the user resource of the first application account. Therefore, an application can authorize other applications to log in by using an account of this application through general-purpose plug-ins.

Alternatively, on the basis of the alternative scheme in the above scheme, the device may further include an authorization identifier verification module.

The authorization identifier verification module is configured to acquire an authorization identifier of the second authorization plug-in from the second authorization plug-in, where the authorization identifier is pre-granted by the first application to the second application.

The login code acquisition module 720 is configured to request to acquire the authorized-login code from the authorization service platform through the authorization information about the first application account, when the authorization identifier passes verification from the first authorization plug-in.

Alternatively, on the basis of the alternative scheme in the above scheme, the login code acquisition module 720 may include an interface displaying unit and an authorization information sending unit.

The interface displaying unit is configured to, according to the authorized-login request of the second application, call a local browser, display a webpage login interface, notify a user to perform authorized login of the first application account, and acquire the authorization information.

The authorization information sending unit is configured to send the authorization information to the authorization service platform through the local browser, and request to acquire the authorized-login code from the authorization service platform.

The authorized-login implementation device provided by this embodiment may execute the authorized-login implementation method provided by the embodiments two and three, and have functional modules to execute the methods and effects corresponding to the methods.

Embodiment Nine

Figure 9:
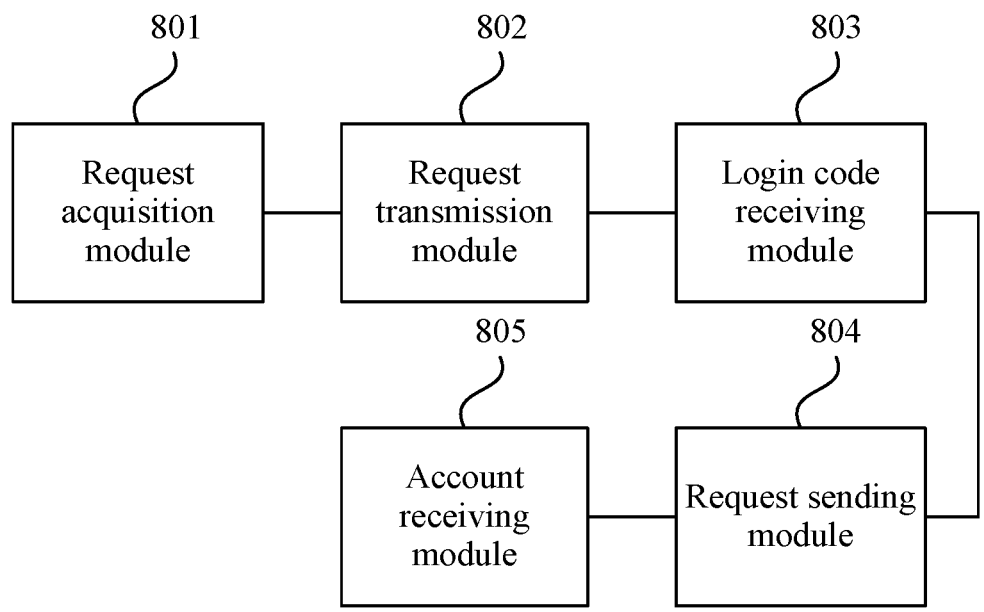
FIG. 9 is a structural diagram of an authorized-login implementation device according to an embodiment nine of the present disclosure.

FIG. 9 is a structural diagram of an authorized-login implementation device according to the embodiment nine of the present disclosure. This embodiment is suitable for the implementation of the authorized login. This device is configured in a second authorization plug-in, may be implemented by software and/or hardware, and may be integrated in a terminal. As shown in FIG. 9, the device includes a request acquisition module 801, a request transmission module 802, a login code receiving module 803, a request sending module 804 and an account receiving module 805.

The request acquisition module 801 is configured to acquire an authorized-login request for performing login by using a first application account, where the authorized-login request is transmitted by a second application client, and the second authorization plug-in is bound to the second application client. The request transmission module 802 is configured to transmit the authorized-login request to a first authorization plug-in bound to a first application client, so as to request the first authorization plug-in to request to acquire an authorized-login code from an authorization service platform through authorization information about the first application account. The login code receiving module 803 is configured to receive the authorized-login code fed back by the first authorization plug-in. The request sending module 804 is configured to send an account login request, which represents that authorization is successful, to the authorization service platform according to the authorized-login code, so as to request the authorization service platform to determine a second application account associated with the first application account according to the first application account in the account login request, and the second application account is used for acquiring a user resource corresponding to the first application account. The account receiving module 805 is configured to receive the second application account fed back by the authorization service platform, and transmit the second application account to the second application client.

In the scheme of this embodiment, the second authorization plug-in acquires the authorized-login request for performing the login by using the first application account, where the authorized-login request is transmitted by the second application client and the second authorization plug-in is bound to the second application client, transmits the authorized-login request to the first authorization plug-in bound to the first application client, receives the authorized-login code fed back by the first authorization plug-in, then sends the account login request, which represents that authorization is successful, to the authorization service platform according to the authorized-login code, receives the second application account fed back by the authorization service platform, and transmits the second application account to the second application client to perform login operations. Therefore, an application can acquire a login authorization of other application through general-purpose plug-ins, and perform login by using the account of other applications.

The authorized-login implementation device provided by this embodiment can execute the authorized-login implementation method provided by the embodiment four, and have functional modules to execute the method and effects corresponding to the method.

Embodiment Ten

Figure 10:
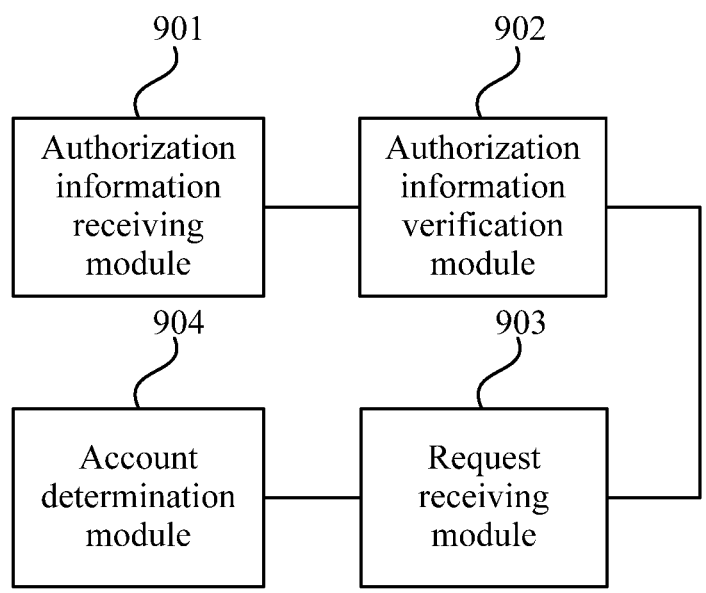
FIG. 10 is a structural diagram of an authorized-login implementation device according to an embodiment ten of the present disclosure.

FIG. 10 is a structural diagram of an authorized-login implementation device according to the embodiment ten of the present disclosure. This embodiment is suitable for the implementation of the authorized login. This device is configured in an authorization service platform, may be implemented by software and/or hardware, and may be integrated in a computer device such as an application service platform. As shown in FIG. 10, the device includes an authorization information receiving module 901, an authorization information verification module 902, a request receiving module 903, and an account determination module 904.

The authorization information receiving module 901 is configured to receive authorization information about a first application account sent by a first authorization plug-in, where the authorization information about the first application account is used for requesting to authorize a second application to perform login by using the first application account. The authorization information verification module 902 is configured to perform verification of the authorization information about the first application account, and after the verification passes, feed back an authorized-login code to the first authorization plug-in. The request receiving module 903 is configured to receive an account login request, which represents that authorization is successful, sent by a second authorization plug-in. The account determination module 904 is configured to determine a second application account associated with the first application account according to the first application account in the account login request, and feed back the second application account to the second authorization plug-in, where the second application account is used for the second application to log in to acquire a user resource corresponding to the first application account. In the above modules, the first authorization plug-in is bound to the first application client, and the second authorization plug-in is bound to the second application client.

In the scheme of this embodiment, the authorization service platform receives the authorization information about the first application account sent by the first authorization plug-in, where the authorization information about the first application account is used for requesting to authorize the second application to perform login by using the first application account; performs verification of the authorization information, and after the verification passes, feeds back the authorized-login code to the first authorization plug-in, so as to transmit the authorized-login code to the second authorization plug-in; determines the second application account associated with the first application account according to the account login request, which represents that the authorization is successful, sent by the second authorization plug-in, and feeds back the second application account to the second authorization plug-in, where the second application account is used for the second application to log in to acquire the user resource corresponding to the first application account. In this way, multiple applications can acquire the login authorization of other application and perform login by using an account of the other application.

Alternatively, on the basis of the alternative scheme in the above scheme, the device may further include a resource copy unit.

The resource copy unit is configured to copy a user resource of the first application account into a user resource table corresponding to the second application account, and the second application account and the first application account have different user identifiers.

Alternatively, on the basis of the alternative scheme in the above scheme, the account determination module 904 may include a historical record inquiry unit and an account acquisition unit.

The historical record inquiry unit is configured to inquire an authorized-login historical record according to the first application account.

The account acquisition unit is configured to acquire the second application account directly in the historical record, if the first application has a historical record of authorizing the second application to log in, and feed back the second application account to the second authorization plug-in.

Alternatively, on the basis of the alternative scheme in the above scheme, the account determination module 904 may further include an account establishment unit.

The account establishment unit is configured to establish the second application account associated with the first application account according to the first application account in the account login request, and feed back the second application account to the second authorization plug-in.

The authorized-login implementation device provided by this embodiment can execute the authorized-login implementation method provided by the embodiments five, six and seven, and have functional modules to execute the methods and effects corresponding to the methods.

Embodiment Eleven

Figure 11:
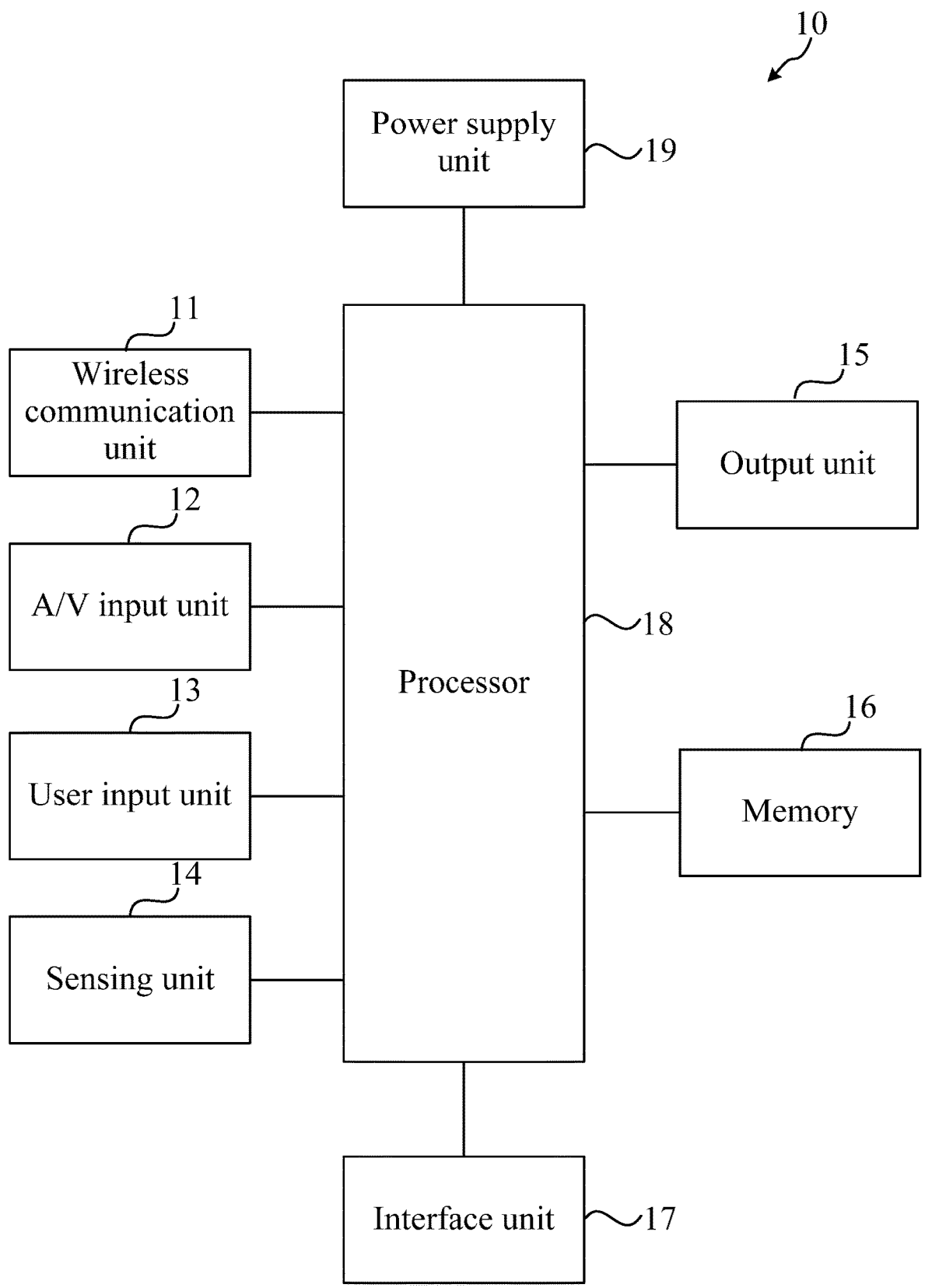
FIG. 11 is a structural diagram of a terminal according to an embodiment eleven of the present disclosure.

FIG. 11 is a structural diagram of a terminal according to the embodiment eleven of the present disclosure. The terminal may be implemented in various forms. The terminal may include a mobile terminal device such as a mobile phone, a smart phone, a laptop, a digital broadcast receiver, a personal digital assistant (PDA), a portable Android device (PAD), a portable media player (PMP), a navigation apparatus, an in-vehicle terminal device, an in-vehicle display terminal, an in-vehicle electronic rearview mirror, etc., and a stationary terminal device such as a television (TV), a desktop computer, etc.

As shown in FIG. 11, the terminal 10 may include a wireless communication unit 11, an audio/video (A/V) input unit 12, a user input unit 13, a sensing unit 14, an output unit 15, a memory 16, an interface unit 17, a processor 18, a power supply unit 19, etc. FIG. 11 shows the terminal having various components, but it is to be understood that the implementation with all of the illustrated components is not required. Instead, more or fewer components may be implemented.

The wireless communication unit 11 allows the terminal 10 to perform wireless communications with a wireless communication system or network. The A/V input unit 12 is configured to receive an audio signal or a video signal. The user input unit 13 may generate key input data according to a command input by a user to control various operations of the terminal. The sensing unit 14 detects a current state of the terminal 10, a location of the terminal 10, whether there is a touch input by the user onto the terminal 10, an orientation of the terminal 10, an acceleration or deceleration movement and a direction of the terminal 10, etc., and generates commands or signals for controlling operations of the terminal 10. The interface unit 17 serves as an interface through which at least one external apparatus may connect to the terminal 10. The output unit 15 is configured to provide an output signal in a visual, audible and/or tactile manner. The memory 16 may store software programs used for the processing and controlling operations performed by the processor 18, or may temporarily store data that has output or is to be output. The memory 16 may include at least one type of storage media. The terminal 10 may cooperate with a network storage apparatus that performs the storage function of the memory 16 via a network connection. The processor 18 usually controls overall operations of the terminal. In addition, the processor 18 may include a multimedia module for reproducing or playing back multimedia data. The processor 18 may perform a pattern recognition processing to recognize a handwriting input or a picture drawing input performed on a touch panel as characters or images. The power supply unit 19 receives external power or internal power and supplies the appropriate power required for operating respective elements and components under the control of the processor 18.

The processor 18, by executing the program stored in the memory 16, performs various functional applications and data processing, for example, to implement an authorized-login implementation method provided by the embodiments of the present disclosure. The method may include steps described below, a first authorization plug-in bound to a first application client receives an authorized-login request from a second authorization plug-in bound to a second application client, the authorized-login request is used for a second application to request login by using a first application account; the first authorization plug-in requests from an authorization service platform to acquire an authorized-login code through authorization information about the first application account; and the first authorization plug-in feeds back the authorized-login code to the second authorization plug-in, so as to instruct the second authorization plug-in to request to acquire a second application account from the authorization service platform according to the authorized-login code, and the second application account is used for accessing a user resource of the first application account.

In another example, the processor 18 implements another authorized-login implementation method provided by the embodiments of the present disclosure. The method may include steps described below, the second authorization plug-in acquires an authorized-login request for performing login by using a first application account, the authorized-login request is transmitted by a second application client, and the second authorization plug-in is bound to the second application client; the second authorization plug-in transmits the authorized-login request to a first authorization plug-in bound to a first application client, so as to request the first authorization plug-in to request to acquire an authorized-login code from an authorization service platform through authorization information about the first application account; the second authorization plug-in receives the authorized-login code fed back by the first authorization plug-in; the second authorization plug-in sends an account login request, which represents that authorization is successful, to the authorization service platform according to the authorized-login code, so as to request the authorization service platform to determine a second application account associated with the first application account according to the first application account in the account login request, the second application account is used for acquiring a user resource corresponding to the first application account; and the second authorization plug-in receives the second application account fed back by the authorization service platform, and transmits the second application account to the second application client.

Embodiment Twelve

Figure 12:
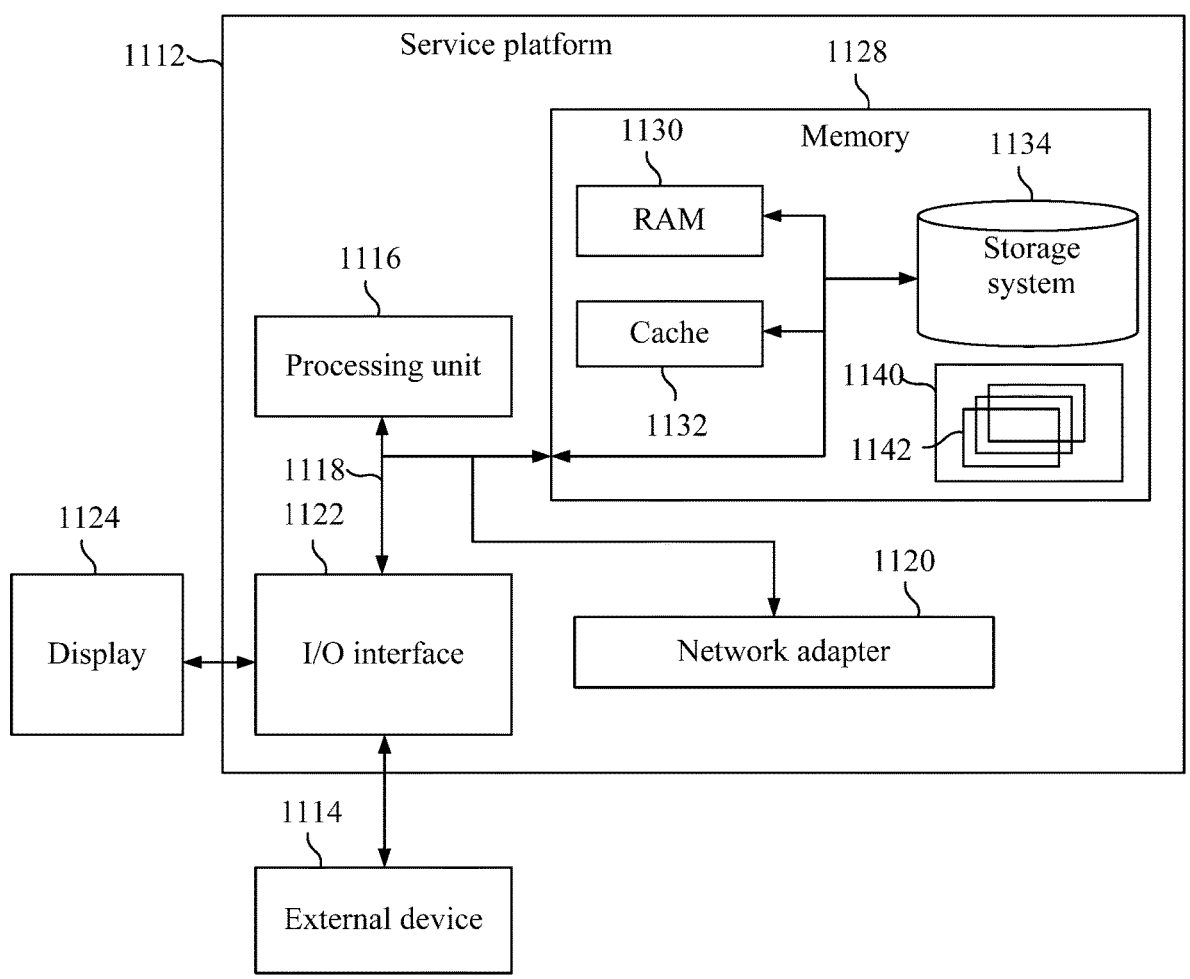
FIG. 12 is a structural diagram of a service platform according to an embodiment twelve of the present disclosure.

FIG. 12 is a structural diagram of a service platform according to the embodiment twelve of the present disclosure. FIG. 12 illustrates a block diagram of an exemplary service platform 1112 suitable for implementing the embodiments of the present disclosure. The service platform 1112 illustrated in FIG. 12 is only an example.

As shown in FIG. 12, the service platform 1112 is shown in the form of a general-purpose computing device. Components of the service platform 1112 may include one or more processors or processing units 1116, a system memory 1128, and a bus 1118 connecting different system components (including the system memory 1128 and the one or more processing units 1116).

The bus 1118 represents one or more of several types of bus structures, including a memory bus or memory controller, a peripheral bus, an accelerated graphics port, and a processor or local bus using any of a variety of bus architectures. By way of example, such architectures include an industry standard architecture (ISA) bus, a micro channel architecture (MCA) bus, an enhanced ISA bus, a video electronics standards association (VESA) local bus, and a peripheral component interconnects (PCI) bus.

The service platform 1112 includes a variety of computer system readable media. Such media may be any available media that is accessible by the service platform 1112 and include both volatile and non-volatile media, removable and non-removable media.

The system memory 1128 may include computer readable media in the form of volatile memory, such as random access memory (RAM) 1130 and/or a cache 1132. The service platform 1112 may include other removable/non-removable, volatile/non-volatile computer system storage media. By way of example only, the storage system 1134 may be configured to read from and write to non-removable, non-volatile magnetic media (not shown in FIG. 12, commonly referred to as a "hard disk drive"). Although not shown in FIG. 12, a magnetic disk drive for reading from or writing to removable, non-volatile magnetic media (e.g., a "floppy disk"), and an optical disk drive for reading from or writing to a removable, non-volatile optical disk (e.g., a compact disc read-only memory (CD-ROM), a digital video disc-read only memory (DVD-ROM), or other optical media) may be provided. In such instances, each drive can be connected to the bus 1118 by one or more data media interfaces. The memory 1128 may include at least one program product having a set (e.g., at least one) of program modules that are configured to perform the functions of the embodiments of the present disclosure.

Program/utility 1140, having a set (at least one) of program modules 1142, may be stored in the memory 1128. Such operation modules 1142 include, by way of example, an operating system, one or more application programs, other program modules, and program data. Each of the exemplary operation modules 1142 or some combination thereof may include an implementation of a network environment. Each program module 1142 generally performs functions and/or methods in the embodiments of the present disclosure.

The service platform 1112 may also communicate with one or more external devices 1114 (e.g., a keyboard, a pointing device, a display 1124, etc.), and may also communicate with one or more devices that enable the user to interact with the service platform 1112, and/or communicate with any device (e.g., a network card, a modem, etc.) that enables the service platform 1112 to communicate with one or more other computing devices. Such communication may be performed through an input/output (I/O) interface 1122. Moreover, the service platform 1112 may also communicate with one or more networks (e.g., a local area networks (LAN), a wide area networks (WAN) and/or a public network, for example the Internet) through a network adapter 1120. As shown in FIG. 12, the network adapter 1120 communicates with other modules of the service platform 1112 via the bus 1118. It is to be understood that although not shown in FIG. 12, other hardware and/or software modules may be used in conjunction with the service platform 1112. Such other hardware and/or software modules included a microcode, a device driver, a redundant processor, an external disk drive array, a system of redundant arrays of independent disks (RAID), a tape driver, a data backup storage system, etc.

The processing unit 1116 will perform various functional applications and data processing via executing the program stored in the memory 1128, for example, implementing the authorized-login implementation method provided by the embodiments of the present disclosure. That is, the following steps are implemented: the authorization service platform receives authorization information about a first application account sent by a first authorization plug-in, where the authorization information about the first application account is used for requesting to authorize a second application to perform login by using the first application account; the authorization service platform performs verification of the authorization information about the first application account, and after the verification passes, an authorized-login code is fed back to the first authorization plug-in; the authorization service platform receives an account login request, which represents that authorization is successful, sent by a second authorization plug-in; and the authorization service platform determines a second application account associated with the first application account according to the first application account in the account login request, and the second application account is fed back to the second authorization plug-in, where the second application account is used for the second application to log in to acquire a user resource corresponding to the first application account. In the above steps, the first authorization plug-in is bound to a first application client, and the second authorization plug-in is bound to a second application client.

Embodiment Thirteen

Figure 13:
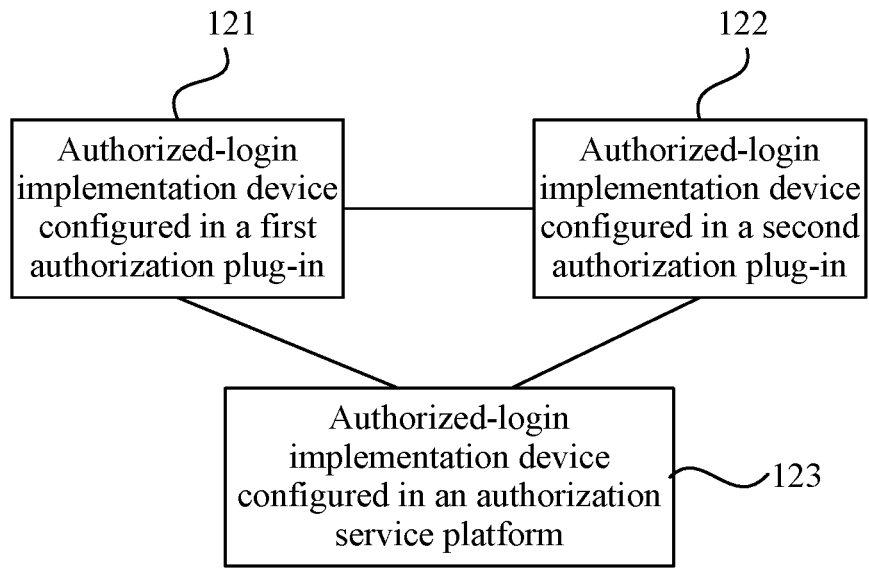
FIG. 13 is a structural diagram of an authorized-login system according to an embodiment thirteen of the present disclosure.

FIG. 13 is a structural diagram of an authorized-login system according to the embodiment thirteen of the present disclosure. This embodiment is suitable for the implementation of the authorized login. As shown in FIG. 13, the system includes: an authorized-login implementation device 121 configured in a first authorization plug-in, an authorized-login implementation device 122 configured in a second authorization plug-in, and an authorized-login implementation device 123 configured in an authorization service platform.

The authorized-login implementation device 121 configured in the first authorization plug-in includes a request receiving module, a login code acquisition module and a login code feedback module.

The request receiving module is configured to receive an authorized-login request from a second authorization plug-in bound to a second application client, where the authorized-login request is used for a second application to request login by using a first application account. The login code acquisition module is configured to request to acquire an authorized-login code from an authorization service platform through authorization information about the first application account. The login code feedback module is configured to feed back the authorized-login code to the second authorization plug-in, so as to instruct the second authorization plug-in to request to acquire a second application account from the authorization service platform according to the authorized-login code, where the second application account is used for accessing a user resource of the first application account.

The authorized-login implementation device 122 configured in the second authorization plug-in includes a request acquisition module, a request transmission module, a login code receiving module, a request sending module and an account receiving module.

The request acquisition module is configured to acquire an authorized-login request for performing login by using a first application account, where the authorized-login request is transmitted by a second application client, and the second authorization plug-in is bound to the second application client. The request transmission module is configured to transmit the authorized-login request to a first authorization plug-in bound to a first application client, so as to request the first authorization plug-in to request to acquire an authorized-login code from an authorization service platform through authorization information about the first application account. The login code receiving module is configured to receive the authorized-login code fed back by the first authorization plug-in. The request sending module is configured to send an account login request, which represents that authorization is successful, to the authorization service platform according to the authorized-login code, so as to request the authorization service platform to determine a second application account associated with the first application account according to the first application account in the account login request, where the second application account is used for acquiring a user resource corresponding to the first application account. The account receiving module is configured to receive the second application account fed back by the authorization service platform, and transmit the second application account to the second application client.

The authorized-login implementation device 123 configured in the authorization service platform includes an authorization information receiving module, an authorization information verification module, a request receiving module, and an account determination module.

The authorization information receiving module is configured to receive authorization information about a first application account sent by a first authorization plug-in, where the authorization information about the first application account is used for requesting to authorize a second application to perform login by using the first application account. The authorization information verification module is configured to perform verification of the authorization information about the first application account, and after the verification passes, feed back an authorized-login code to the first authorization plug-in. The request receiving module is configured to receive an account login request, which represents that authorization is successful, sent by a second authorization plug-in. The account determination module is configured to determine a second application account associated with the first application account according to the first application account in the account login request, and feed back the second application account to the second authorization plug-in, where the second application account is used for the second application to log in to acquire a user resource corresponding to the first application account. In the above modules, the first authorization plug-in is bound to a first application client, and the second authorization plug-in is bound to a second application client.

Figure 14:
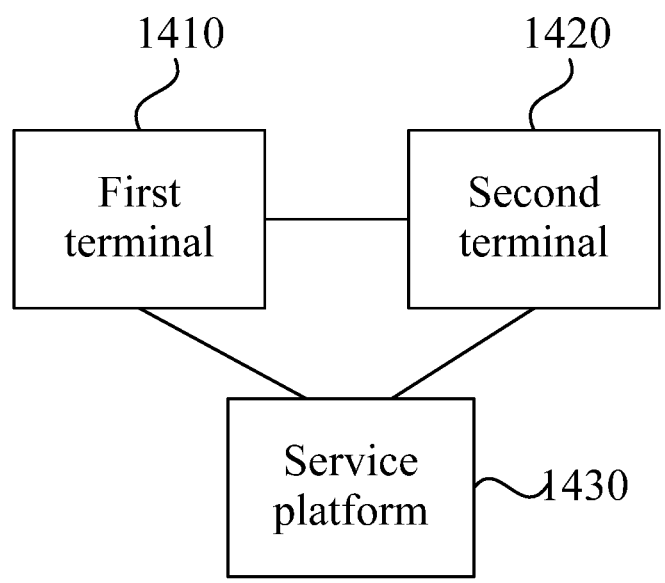
FIG. 14 is a structural diagram of another authorized-login system according to the embodiment thirteen of the present disclosure.

In one embodiment, as shown in FIG. 14, the authorized-login system provided by this embodiment may include a first terminal 1410, a second terminal 1420 and a service platform 1430.

The first terminal 1410 is configured to implement the method applied to the first authorization plug-in.

The second terminal 1420 is configured to implement the method applied to the second authorization plug-in.

The service platform 1430 is configured to implement the method applied to the authorization service platform.

In this embodiment, the authorized login may be implemented by setting authorization plug-ins bound to application clients respectively and a common authorization service platform and by means of interaction between the authorization plug-ins and interaction between the authorization plug-ins and the authorization service platform when an account of an application needs to be authorized for login. The above scheme does not need to separately develop related authorized login subprograms during the development of the application client, and instead, the above scheme is implemented through the general-purpose plug-in. Furthermore, the authorization service platform can provide the peer-to-peer authorization service between different authorization plug-ins and preconditions and guarantees for implementing the bidirectional authorization. Therefore, the user requirements for flexible use of various application accounts can be satisfied, and the authorization login interaction between various applications can be implemented on the basis of authorization login interaction between various applications and the authorization service platform through the general-purpose plug-in, so as to optimize the authorized login manner and make allowable authorization relationships more abundant and flexible.

Embodiment Fourteen

The embodiment fourteen further provides a computer readable storage medium configured to store a computer program which, when executed by a processor, implements the authorized-login implementation method provided by the embodiments of the present disclosure. The method may include: receiving, by a first authorization plug-in bound to a first application client, an authorized-login request from a second authorization plug-in bound to a second application client, where the authorized-login request is used for a second application to request login by using a first application account; requesting, by the first authorization plug-in from an authorization service platform, to acquire an authorized-login code through authorization information about the first application account; and feeding back, by the first authorization plug-in, the authorized-login code to the second authorization plug-in, so as to instruct the second authorization plug-in to request to acquire a second application account from the authorization service platform according to the authorized-login code, where the second application account is used for accessing a user resource of the first application account.

In another example, the computer program implements an authorized-login implementation method provided by the embodiments of the present disclosure. The method may include: acquiring, by the second authorization plug-in, an authorized-login request for performing login by using a first application account, where the authorized-login request is transmitted by a second application client, and the second authorization plug-in is bound to the second application client; transmitting, by the second authorization plug-in, the authorized-login request to a first authorization plug-in bound to a first application client, so as to request the first authorization plug-in to request to acquire an authorized-login code from an authorization service platform through authorization information about the first application account; receiving, by the second authorization plug-in, the authorized-login code fed back by the first authorization plug-in; sending, by the second authorization plug-in to the authorization service platform, an account login request, which represents that authorization is successful, according to the authorized-login code, so as to request the authorization service platform to determine a second application account associated with the first application account according to the first application account in the account login request, where the second application account is used for acquiring a user resource corresponding to the first application account; and receiving, by the second authorization plug-in, the second application account fed back by the authorization service platform, and transmitting the second application account to the second application client.

In another example, the computer program implements an authorized-login implementation method provided by the embodiments of the present disclosure. The method may include: receiving, by an authorization service platform, authorization information about a first application account sent by a first authorization plug-in, where the authorization information about the first application account is used for requesting to authorize a second application to perform login by using the first application account; performing, by the authorization service platform, verification of the authorization information about the first application account, and after the verification passes, feeding back an authorized-login code to the first authorization plug-in; receiving, by the authorization service platform, an account login request, which represents that authorization is successful, sent by a second authorization plug-in; and determining, by the authorization service platform, a second application account associated with the first application account according to the first application account in the account login request, and feeding back the second application account to the second authorization plug-in, where the second application account is used for the second application to log in to acquire a user resource corresponding to the first application account. In the above steps, the first authorization plug-in is bound to a first application client, and the second authorization plug-in is bound to a second application client.

The computer storage medium provided by this of the present disclosure may employ any combination of one or more computer readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. More specific examples of the computer-readable storage medium include (non-exhaustive list): an electrical connection having one or more wires, a portable computer magnetic disk, a hard disk, a random access memory (RAM), a read only memory (ROM), an erasable programmable read only memory (EPROM or flash memory), an optical fiber, a portable compact disk read only memory (CD-ROM), an optical memory device, a magnetic memory device, or any suitable combination thereof. In this document, the computer-readable storage medium may be any tangible medium containing or storing a program. The program may be used by or used in conjunction with an instruction execution system, apparatus or device.

The computer readable signal medium may include a propagated data signal with computer readable program code embodied therein, for example, in baseband or as part of a carrier wave. This propagated data signal may take various forms including an electromagnetic signal, an optical signal, or any suitable combination thereof. The computer readable signal medium may be any computer readable medium that is not a computer readable storage medium and that may communicate, propagate, or transport a program for using by an instruction processing system, apparatus, or device, or using in connection with an instruction processing system, apparatus, or device.

The program code embodied in the computer-readable medium may be transmitted using any appropriate medium, including wireless, wired, optical fiber cable, radio frequency (RF), etc., or any appropriate combination thereof.

Computer program code for performing the operations of the present disclosure may be written in one or more programming languages or a combination thereof, including object oriented programming languages such as Java, Smalltalk, C++, Ruby, Go or the like and conventional procedural programming languages such as C programming language or similar programming languages. The program code may be executed entirely on a user's computer, partly on the user's computer, as a stand-alone software package, partly on the user's computer and partly on a remote computer, or entirely on the remote computer or server. In the scenario involving the remote computer, the remote computer may be connected to the user's computer through any type of network, including a LAN or WAN, or the connection may be made to an external computer (e.g., through the Internet using an Internet service provider).

What is claimed is:

1. An authorized-login implementation method, comprising:
   receiving, by a first authorization plug-in bound to a first application client, an authorized-login request from a second authorization plug-in bound to a second application client, wherein the authorized-login request is used for a second application to request login by using a first application account;
   requesting, by the first authorization plug-in, to acquire an authorized-login code from an authorization service platform through authorization information about the first application account; and
   feeding back, by the first authorization plug-in, the authorized-login code to the second authorization plug-in, so as to instruct the second authorization plug-in to request to acquire a second application account from the authorization service platform according to the authorized-login code, wherein the second application account is used for accessing a user resource of the first application account.

2. The method of claim 1, wherein before requesting, by the first authorization plug-in, to acquire the authorized-login code from the authorization service platform through the authorization information about the first application account, the method further comprises:
   acquiring, by the first authorization plug-in, an authorization identifier of the second authorization plug-in from the second authorization plug-in, wherein the authorization identifier is pre-granted by the first application to the second application;
   wherein requesting, by the first authorization plug-in from the authorization service platform, to acquire the authorized-login code through the authorization information about the first application account comprises:
   in a case where the authorization identifier passes verification from the first authorization plug-in, requesting to acquire the authorized-login code from the authorization service platform through the authorization information about the first application account.

3. The method of claim 1, wherein requesting, by the first authorization plug-in, to acquire the authorized-login code from the authorization service platform through the authorization information about the first application account comprises:
   calling, by the first authorization plug-in, a local browser according to the authorized-login request of the second application, displaying a webpage login interface, notifying a user to perform authorized login of the first application account, and acquiring the authorization information; and
   sending, by the first authorization plug-in, the authorization information to the authorization service platform through the local browser, and requesting to acquire the authorized-login code from the authorization service platform.

4. An authorized-login implementation method, comprising:
   acquiring, by a second authorization plug-in, an authorized-login request for performing login by using a first application account, wherein the authorized-login request is transmitted by a second application client, and the second authorization plug-in is bound to the second application client;
   transmitting, by the second authorization plug-in, the authorized-login request to a first authorization plug-in bound to a first application client, so as to request the first authorization plug-in to request to acquire an authorized-login code from an authorization service platform through authorization information about the first application account;

receiving, by the second authorization plug-in, the authorized-login code fed back by the first authorization plug-in;

sending, by the second authorization plug-in, to the authorization service platform an account login request, which represents that authorization is successful, according to the authorized-login code, so as to request the authorization service platform to determine a second application account associated with the first application account according to the first application account in the account login request, wherein the second application account is used for acquiring a user resource corresponding to the first application account; and receiving, by the second authorization plug-in, the second application account fed back by the authorization service platform, and transmitting the second application account to the second application client.

5. An authorized-login implementation method, comprising:

receiving, by an authorization service platform, authorization information about a first application account sent by a first authorization plug-in, wherein the authorization information about the first application account is used for requesting to authorize a second application to perform login by using the first application account;

performing, by the authorization service platform, verification of the authorization information about the first application account, and after the verification passes, feeding back an authorized-login code to the first authorization plug-in;

receiving, by the authorization service platform, an account login request, which represent that authorization is successful, sent by a second authorization plug-in; and determining, by the authorization service platform, a second application account associated with the first application account according to the first application account in the account login request, and feeding back the second application account to the second authorization plug-in, wherein the second application account is used for the second application to log in to acquire a user resource corresponding to the first application account;

wherein the first authorization plug-in is bound to a first application client, and the second authorization plug-in is bound to a second application client.

6. The method of claim 5, after determining the second application account associated with the first application account, further comprising:

copying, by the authorization service platform, the user resource of the first application account into a user resource table corresponding to the second application account, wherein the second application account and the first application account have different user identifiers.

7. The method of claim 5, wherein determining, by the authorization service platform, the second application account associated with the first application account according to the first application account in the account login request, and feeding back the second application account to the second authorization plug-in comprise:

inquiring, by the authorization service platform, an authorized-login historical record according to the first application account; and in response to the first application having a historical record of authorizing the second application to log in, acquiring, by the authorization service platform, the second application account in the historical record directly, and feeding back the second application account to the second authorization plug-in.

8. The method of claim 5, wherein determining, by the authorization service platform, the second application account associated with the first application account according to the first application account in the account login request, and feeding back the second application account to the second authorization plug-in comprise:

establishing, by the authorization service platform according to the first application account in the account login request, the second application account associated with the first application account, and feeding back the second application account to the second authorization plug-in.

9. An authorized-login implementation device, configured in a first authorization plug-in, applied to the authorized-login implementation method of claim 1, wherein the first authorization plug-in is bound to a first application client and the device comprises:

a request receiving module, configured to receive an authorized-login request from a second authorization plug-in bound to a second application client, wherein the authorized-login request is used for a second application to request login by using a first application account;

a login code acquisition module, configured to request to acquire an authorized-login code from an authorization service platform through authorization information about the first application account; and a login code feedback module, configured to feed back the authorized-login code to the second authorization plug-in, so as to instruct the second authorization plug-in to request to acquire a second application account from the authorization service platform according to the authorized-login code, wherein the second application account is used for accessing a user resource of the first application account.

10. An authorized-login implementation device, configured in a second authorization plug-in, applied to the authorized-login implementation method of claim 4, comprising:

a request acquisition module, configured to acquire an authorized-login request for performing login by using a first application account, wherein the authorized-login request is transmitted by a second application client, and the second authorization plug-in is bound to the second application client;

a request transmission module, configured to transmit the authorized-login request to a first authorization plug-in bound to a first application client, so as to request the first authorization plug-in to request to acquire an authorized-login code from an authorization service platform through authorization information about the first application account;

a login code receiving module, configured to receive the authorized-login code fed back by the first authorization plug-in;

a request sending module, configured to send, to the authorization service platform, an account login request, which represents that authorization is successful, according to the authorized-login code, so as to request the authorization service platform to determine a second application account associated with the first application account according to the first application account in the account login request, wherein the second application account is used for acquiring a user resource corresponding to the first application account; and an account receiving module, configured to receive the second application account fed back by the authorization service platform, and transmit the second application account to the second application client.

11. An authorized-login implementation device, configured in an authorization service platform, applied to the authorized-login implementation method of claim 5, comprising:

an authorization information receiving module, configured to receive authorization information about a first application account sent by a first authorization plug-in, wherein the authorization information about the first application account is used for requesting to authorize a second application to perform login by using the first application account;

an authorization information verification module, configured to: perform verification of the authorization information about the first application account, and after the verification passes, feed back an authorized-login code to the first authorization plug-in;

a request receiving module, configured to receive an account login request, which represents that authorization is successful, sent by a second authorization plug-in; and an account determination module, configured to: determine, according to the first application account in the account login request, a second application account associated with the first application account, and feed back the second application account to the second authorization plug-in, wherein the second application account is used for the second application to log in to acquire a user resource corresponding to the first application account, the first authorization plug-in is bound to a first application client, and the second authorization plug-in is bound to a second application client.

12. A terminal, comprising:
at least one processor; and
a memory, configured to store at least one program;
wherein the at least one program, when executed by the at least one processor, causes the at least one processor to implement the authorized-login implementation method of claim 1.

13. A terminal, comprising:
at least one processor; and
a memory, configured to store at least one program;
wherein the at least one program, when executed by the at least one processor, causes the at least one processor to implement the authorized-login implementation method of claim 4.

14. A service platform, comprising:
at least one processor; and
a memory, configured to store at least one program;
wherein the at least one program, when executed by the at least one processor, causes the at least one processor to implement the authorized-login implementation method of claim 5.

15. An authorized-login system, comprising a first terminal, configured to implement the authorized-login implementation method of claim 1.

16. An authorized-login system, further comprising a second terminal, configured to implement the authorized-login implementation method of claim 4.

17. An authorized-login system, further comprising a service platform, configured to implement the authorized-login implementation method of claim 5.

18. A non-transitory computer-readable storage medium, configured to store a computer program which, when executed by a processor, implements the authorized-login implementation method of claim 1.

19. A non-transitory computer-readable storage medium, configured to store a computer program which, when executed by a processor, implements the authorized-login implementation method of claim 4.

20. A non-transitory computer-readable storage medium, configured to store a computer program which, when executed by a processor, implements the authorized-login implementation method of claim 5.

* * * * *